US012793270B2

(12) United States Patent
Mizoguchi et al.

(10) Patent No.: US 12,793,270 B2
(45) Date of Patent: Nov. 10, 2026

(54) IMAGE PROCESSING APPARATUS, IMAGE PROCESSING METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventors: Yoshinori Mizoguchi, Tokyo (JP); Akitoshi Yamada, Kanagawa (JP); Kouta Murasawa, Kanagawa (JP); Fumino Matsui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 313 days.

(21) Appl. No.: 18/544,008

(22) Filed: Dec. 18, 2023

(65) Prior Publication Data

US 2024/0202977 A1 Jun. 20, 2024

(30) Foreign Application Priority Data

Dec. 20, 2022 (JP) ................................. 2022-203525
May 25, 2023 (JP) ................................. 2023-086431

(51) Int. Cl.
*G06T 7/90* (2017.01)
*G06T 5/20* (2006.01)
(Continued)

(52) U.S. Cl.
CPC .................. *G06T 7/90* (2017.01); *G06T 5/20* (2013.01); *H04N 1/603* (2013.01); *H04N 9/64* (2013.01);
(Continued)

(58) Field of Classification Search
None
See application file for complete search history.

(56) References Cited

U.S. PATENT DOCUMENTS 6,016,359 A 1/2000 Komatsu .................. H04N 1/60
6,765,586 B2 7/2004 Yamazaki et al. ....... B41J 2/525
(Continued)

FOREIGN PATENT DOCUMENTS

EP 0961488 12/1999
JP H07-203234 8/1995
(Continued)

OTHER PUBLICATIONS

Extended European Search Report dated Apr. 30, 2024 in counterpart EP Application No. 23217467.2.
(Continued)

*Primary Examiner* — Soo Shin
(74) *Attorney, Agent, or Firm* — Venable LLP

(57) ABSTRACT

An image processing apparatus including an input unit to input image data, a generation unit to generate image data having undergone color gamut conversion from the image input data using a conversion unit to convert a color gamut of the input image data input into a color gamut of a device to output the image data, a correction unit to correct the conversion unit based on the color gamut conversion, and a control unit to control the correction for a content included in the input image data. The control unit controls execution of the correction based on a type of the content, and performs control, when the content is of a first type, to execute the correction for the content, and performs control, when the content is of a second type different from the first type, not to execute the correction by the correction unit for the content.

32 Claims, 20 Drawing Sheets

(51) Int. Cl.
*G06V 10/764* (2022.01)
*H04N 1/60* (2006.01)
*H04N 9/64* (2023.01)

(52) U.S. Cl.
CPC .. *G06T 2207/10024* (2013.01); *G06V 10/764* (2022.01)

(56) References Cited

U.S. PATENT DOCUMENTS 8,477,366 B2 7/2013 Bang et al. .............. H04N 1/60
8,947,741 B2 2/2015 Suzuki et al. ......... H04N 1/387
10,764,472 B2 9/2020 Yamashita ............... H04N 1/60
2001/0019427 A1* 9/2001 Komatsu .............. H04N 1/6058 358/1.18
2002/0063898 A1 5/2002 Goto et al. ................ G06T 1/00
2003/0030829 A1 2/2003 Kagawa ..................... B41J 2/21
2003/0164983 A1 9/2003 Yamada et al. ........... G06T 5/00
2004/0001230 A1 1/2004 Kagawa ..................... B41J 5/30
2004/0196478 A1 10/2004 Imafuku et al. .......... G06T 5/00
2006/0061785 A1 3/2006 Nagoshi et al. ......... H04N 1/60
2006/0232799 A1 10/2006 Nakatani et al. ........ H04N 1/60
2008/0002901 A1 1/2008 Miyagi et al. ........... G06K 9/40
2009/0009833 A1 1/2009 Nakamura ................ G03F 3/08
2010/0027072 A1* 2/2010 Enjuji ....................... G06T 5/40 358/3.01
2010/0053651 A1* 3/2010 Ono ....................... H04N 1/603 358/1.9
2010/0157336 A1 6/2010 Nakatani .................. H04N 1/60
2010/0302404 A1* 12/2010 Mizukura .............. H04N 23/85 348/222.1
2011/0038020 A1 2/2011 Kagawa ................... H04N 1/46
2011/0285777 A1 11/2011 Goto et al. ............... B41J 2/205
2011/0285778 A1 11/2011 Ishikawa et al. ........ B41J 2/205
2011/0285779 A1 11/2011 Yamada et al. .......... B41J 2/205
2012/0081441 A1 4/2012 Miyake et al. .......... B41J 2/205
2012/0081442 A1 4/2012 Ikeda et al. .............. B41J 2/205
2012/0081444 A1 4/2012 Saito et al. .............. B41J 2/205
2012/0081768 A1 4/2012 Iguchi et al. ............. G03F 3/08
2012/0210229 A1* 8/2012 Bryant ..................... G09G 5/02 715/723
2014/0055518 A1 2/2014 Saito et al. .............. B41J 2/205
2015/0022863 A1 1/2015 Fujita et al. ........... G06K 15/02
2018/0174271 A1 6/2018 Hashii et al. ............. G06T 3/40
2020/0007695 A1 1/2020 Kagawa et al. ......... H04N 1/00
2021/0218865 A1 7/2021 Tsuchiya et al. ........ H04N 1/64
2022/0253655 A1 8/2022 Abe et al. .............. G06K 15/02
2022/0358777 A1 11/2022 Mizoguchi et al. ... G06V 30/19
2023/0124689 A1 4/2023 Yamada et al. .......... H04N 1/60
2023/0347673 A1 11/2023 Abe et al. ................ B41M 3/06
2024/0013507 A1 1/2024 Murasawa et al. .... G06V 10/56
2024/0106964 A1 3/2024 Nakamura et al. ...... H04N 1/60
2024/0202977 A1 6/2024 Mizoguchi et al. ...... G06T 7/90

FOREIGN PATENT DOCUMENTS

JP 2014-060592 4/2014
JP 2020-027948 2/2020
JP 2024-008265 1/2024

OTHER PUBLICATIONS

U.S. Appl. No. 18/544,000, filed Dec. 18, 2023.
Notice of Allowance dated Feb. 12, 2025 in U.S. Appl. No. 18/544,000.

* cited by examiner

ORIGINAL

IMAGE PROCESSING APPARATUS, IMAGE PROCESSING METHOD, AND NON-TRANSITORY COMPUTER-READABLE STORAGE MEDIUM STORING PROGRAM

BACKGROUND OF THE INVENTION

Cross Reference to Priority Applications

This application claims the benefit of Japanese Patent Application No. 2022-203525, filed Dec. 20, 2022, and Japanese Patent Application No. 2023-086431, filed May 25, 2023, which are hereby incorporated by reference herein in their entirety.

FIELD OF THE INVENTION

The present invention relates to an image processing apparatus capable of executing color mapping, an image processing method, and a non-transitory computer-readable storage medium storing a program.

DESCRIPTION OF THE RELATED ART

There is known an image processing apparatus that receives a digital original described in a predetermined color space, performs, for each color in the color space, mapping to a color gamut that can be reproduced by a printer, and outputs the original. Japanese Patent Laid-Open No. 2020-27948 describes "perceptual" mapping and "absolute colorimetric" mapping. In addition, Japanese Patent Laid-Open No. 07-203234 describes deciding the presence/absence of color space compression and the compression direction for an input color image signal.

SUMMARY OF THE INVENTION

The present invention provides a technique for appropriately performing color mapping to a print color gamut based on the type of a content in image data.

The present invention in its first aspect provides an image processing apparatus comprising at least one memory and at least one processor which function as an input unit configured to input image data, a generation unit configured to generate image data having undergone color gamut conversion from the image data input by the input unit using a conversion unit configured to convert a color gamut of the image data input by the input unit into a color gamut of a device configured to output the image data, a correction unit configured to correct the conversion unit based on a result of the color gamut conversion; and a control unit configured to control execution of the correction by the correction unit for a content included in the image data input by the input unit, wherein the control unit controls execution of the correction by the correction unit for the content based on a type of the content, in a case when the correction unit corrects the conversion unit, the generation unit generates image data having undergone color gamut conversion from the image data input by the input unit using the corrected conversion unit, and, in the image data having undergone the color gamut conversion by the corrected conversion unit, a color difference in the image data having undergone the color gamut conversion by the conversion unit before the correction is expanded.

The present invention in its second aspect provides an image processing method comprising inputting image data; generating image data having undergone color gamut conversion from the input image data using a conversion unit configured to convert a color gamut of the input image data into a color gamut of a device configured to output the image data, correcting the conversion unit based on a result of the color gamut conversion, and controlling execution of the correction for a content included in the input image data, wherein execution of the correction for the content is controlled based on a type of the content, in a case when the conversion unit is corrected, image data having undergone color gamut conversion from the input image data is generated using the corrected conversion unit, and, in the image data having undergone the color gamut conversion by the corrected conversion unit, a color difference in the image data having undergone the color gamut conversion by the conversion unit before the correction is expanded.

The present invention in its third aspect provides a non-transitory computer-readable storage medium storing a program configured to cause a computer to function to input image data; generate image data having undergone color gamut conversion from the input image data using a conversion unit configured to convert a color gamut of the input image data into a color gamut of a device configured to output the image data; correct the conversion unit based on a result of the color gamut conversion and to control execution of the correction for a content included in the input image data, wherein execution of the correction for the content is controlled based on a type of the content, in a case when the conversion unit is corrected, image data having undergone color gamut conversion from the input image data is generated using the corrected conversion unit, and, in the image data having undergone the color gamut conversion by the corrected conversion unit, a color difference in the image data having undergone the color gamut conversion by the conversion unit before the correction is expanded.

According to the present invention, it is possible to appropriately perform color mapping to a print color gamut based on the type of a content in image data.

Further features of the present invention will become apparent from the following description of exemplary embodiments with reference to the attached drawings.

DESCRIPTION OF THE EMBODIMENTS

Figure 1:
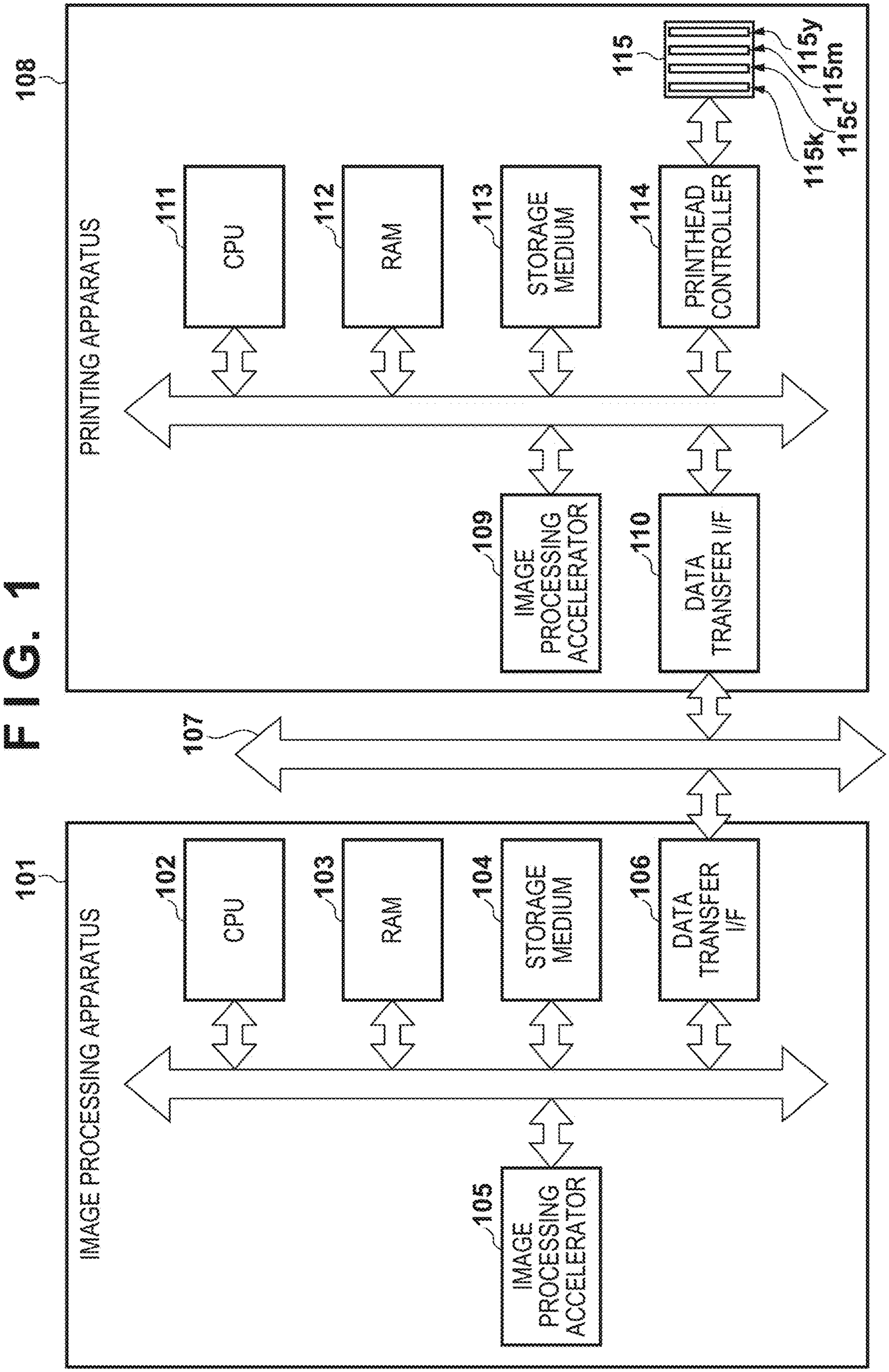
FIG. 1 is a block diagram showing the arrangement of an image processing apparatus.

Hereafter, embodiments will be described in detail with reference to the attached drawings. Note, the following embodiments are not intended to limit the scope of the claimed invention. Multiple features are described in the embodiments, but a limitation is not made an invention that requires all such features, and multiple such features may be combined as appropriate. Furthermore, in the attached drawings, the same reference numerals are given to the same or similar configurations, and redundant description thereof is omitted.

If color mapping to a print color gamut is performed regardless of the type of a content in image data, an output result of a color suitable to the content may not be obtained.

According to the present disclosure, it is possible to appropriately perform color mapping to a print color gamut based on the type of a content in image data.

First Embodiment

Terms used in this specification are defined in advance, as follows.

(Color Reproduction Region)

"Color reproduction region" is also called a color reproduction range, a color gamut, or a gamut. Generally, "color reproduction region" indicates the range of colors that can be reproduced in an arbitrary color space. In addition, a gamut volume is an index representing the extent of this color reproduction range. The gamut volume is a three-dimensional volume in an arbitrary color space. Chromaticity points forming the color reproduction range are sometimes discrete. For example, a specific color reproduction range is represented by seven hundred twenty-nine points on CIE-L*a*b*, and points between them are obtained by using a well-known interpolating operation such as tetrahedral interpolation or cubic interpolation. In this case, as the corresponding gamut volume, it is possible to use a volume obtained by calculating the volumes on CIE-L*a*b* of tetrahedrons or cubes forming the color reproduction range and accumulating the calculated volumes, in accordance with the interpolating operation method. The color reproduction region and the color gamut in this embodiment are not limited to a specific color space. In this embodiment, however, a color reproduction region in the CIE-L*a*b* space will be explained as an example. Furthermore, the numerical value of a color reproduction region in this embodiment indicates a volume obtained by accumulation in the CIE-L*a*b* space on the premise of tetrahedral interpolation.

(Gamut Mapping)

Gamut mapping is processing of performing conversion between different color gamuts, and is, for example, mapping of an input color gamut to an output color gamut of a device such as a printer. Perceptual, Saturation, Colorimetric, and the like, of the ICC profile are general. The mapping processing may be implemented by, for example, conversion by a three-dimensional lookup table (3DLUT). Furthermore, the mapping processing may be performed after conversion of a color space into a standard color space. For example, if an input color space is sRGB, conversion into the CIE-L*a*b* color space is performed and then the mapping processing to an output color gamut is performed on the CIE-L*a*b* color space. The mapping processing may be conversion by a 3DLUT, or may be performed using a conversion formula. Conversion between the input color space and the output color space may be performed simultaneously. For example, the input color space may be the sRGB color space, and conversion into RGB values or CMYK values unique to a printer may be performed at the time of output.

(Original Data)

Original data indicates whole input digital data as a processing target. The original data includes one to a plurality of pages. Each single page may be held as image data or may be represented as a drawing command. If a page is represented as a drawing command, the page may be rendered and converted into image data, and then processing may be performed. The image data is formed by a plurality of pixels that are two-dimensionally arranged. Each pixel holds information indicating a color in a color space. Examples of the information indicating a color are, for example, RGB values, CMYK values, a K value, CIE-L*a*b* values, HSV values, and HLS values. Note that this embodiment is applicable to one page or a plurality of pages. As an example, this embodiment will describe original data of one page as image data.

(Color Degeneration)

In this embodiment, the fact that when performing gamut mapping for arbitrary two colors, the distance between the colors after mapping in a predetermined color space is smaller than the distance between the colors before mapping is defined as color degeneration. More specifically, assume that there are a color A and a color B in a digital original, and mapping to the color gamut of a printer is performed to convert the color A into a color C and the color B into a color D. In this case, the fact that the distance between the colors C and D is less than the distance between the colors A and B is defined as color degeneration. If color degeneration occurs, colors that are recognized as different colors in the digital original are recognized as identical colors when the original is printed. For example, in a graph, different items have different colors, thereby recognizing the different items. If color degeneration occurs, different colors may be recognized as identical colors, and thus different items of a graph may erroneously be recognized as identical items. The predetermined color space in which the distance between the colors is calculated may be an arbitrary color space. Examples of the color space are the sRGB color space, the Adobe RGB color space, the CIE-L*a*b* color space, the CIE-LUV color space, the XYZ color space, the xyY color space, the HSV color space, and the HLS color space.

FIG. 1 is a block diagram showing an example of the arrangement of an image processing apparatus according to this embodiment. As an image processing apparatus 101, for example, a PC, a tablet, a server, or a printing apparatus is used. FIG. 1 shows an example in which the image processing apparatus 101 is configured separately from a printing apparatus 108. A CPU 102 executes various kinds of image processes by reading out programs stored in a storage medium 104 such as an HDD or ROM to a RAM 103 as a work area and executing the readout programs. For example, the CPU 102 acquires a command from the user via a Human Interface Device (HID) I/F (not shown). Then, the CPU 102 executes various kinds of image processes in accordance with the acquired command and the programs stored in the storage medium 104. Furthermore, the CPU 102 performs predetermined processing for original data acquired via a data transfer I/F 106 in accordance with the program stored in the storage medium 104. The CPU 102 displays the result and various kinds of information on a display (not shown), and transmits them via the data transfer I/F 106.

An image processing accelerator 105 is hardware capable of executing image processing faster than the CPU 102. The image processing accelerator 105 is activated when the CPU 102 writes a parameter and data necessary for image processing at a predetermined address of the RAM 103. The image processing accelerator 105 loads the above-described parameter and data, and then executes the image processing for the data. Note that the image processing accelerator 105 is not an essential element, and the CPU 102 may execute equivalent processing. More specifically, the image processing accelerator is a GPU or an exclusively designed electric circuit. The above-described parameter can be stored in the storage medium 104 or can be externally acquired via the data transfer I/F 106.

In the printing apparatus 108, a CPU 111 reads out a program stored in a storage medium 113 to a RAM 112 as a work area and executes the readout program, thereby comprehensively controlling the printing apparatus 108. An image processing accelerator 109 is hardware capable of executing image processing faster than the CPU 111. The image processing accelerator 109 is activated when the CPU 111 writes a parameter and data necessary for image processing at a predetermined address of the RAM 112. The image processing accelerator 109 loads the above-described parameter and data, and then executes the image processing for the data. Note that the image processing accelerator 109 is not an essential element, and the CPU 111 may execute equivalent processing. The above-described parameter can be stored in the storage medium 113, or can be stored in a storage (not shown) such as a flash memory or an HDD.

The image processing to be performed by the CPU 111 or the image processing accelerator 109 will now be explained. This image processing is, for example, processing of generating, based on acquired print data, data indicating the dot formation position of ink in each scan by a printhead 115. The CPU 111 or the image processing accelerator 109 performs color conversion processing and quantization processing for the acquired print data.

The color conversion processing is processing of performing color separation to ink concentrations to be used in the printing apparatus 108. For example, the acquired print data contains image data indicating an image. In a case when the image data is data indicating an image in a color space coordinate system such as sRGB as the expression colors of a monitor, data indicating an image by color coordinates (R, G, B) of the sRGB is converted into ink data (CMYK) to be handled by the printing apparatus 108. The color conversion method is implemented by, for example, matrix operation processing or processing using a 3DLUT or 4DLUT.

In this embodiment, as an example, the printing apparatus 108 uses inks of black (K), cyan (C), magenta (M), and yellow (Y) for printing. Therefore, image data of RGB signals is converted into image data formed by 8-bit color signals of K, C, M, and Y. The color signal of each color corresponds to the application amount of each ink. Furthermore, the ink colors are four colors of K, C, M, and Y, as examples. However, to improve image quality, it is also possible to use other ink colors such as inks of fluorescence ink (F) and light cyan (Lc), light magenta (Lm), and gray (Gy) having low concentrations. In this case, color signals corresponding to the inks are generated.

After the color conversion processing, quantization processing is performed for the ink data. This quantization processing is processing of decreasing the number of tone levels of the ink data. In this embodiment, quantization is performed by using a dither matrix in which thresholds to be compared with the values of the ink data are arrayed in individual pixels. After the quantization processing, binary data indicating whether to form a dot in each dot formation position is finally generated.

After the image processing is performed, a printhead controller 114 transfers the binary data to the printhead 115. At the same time, the CPU 111 performs printing control via the printhead controller 114 so as to operate a carriage motor (not shown) for operating the printhead 115, and to operate a conveyance motor for conveying a print medium. The printhead 115 scans the print medium and also discharges ink droplets onto the print medium, thereby forming an image.

The image processing apparatus 101 and the printing apparatus 108 are connected to each other via a communication line 107. In this embodiment, a Local Area Network (LAN) will be explained as an example of the communication line 107. However, the connection may also be obtained by using, for example, a USB hub, a wireless communication network using a wireless access point, or a Wifi direct communication function.

A description will be provided below by assuming that the printhead 115 has nozzle arrays for four color inks of cyan (C), magenta (M), yellow (Y), and black (K).

Figure 16:
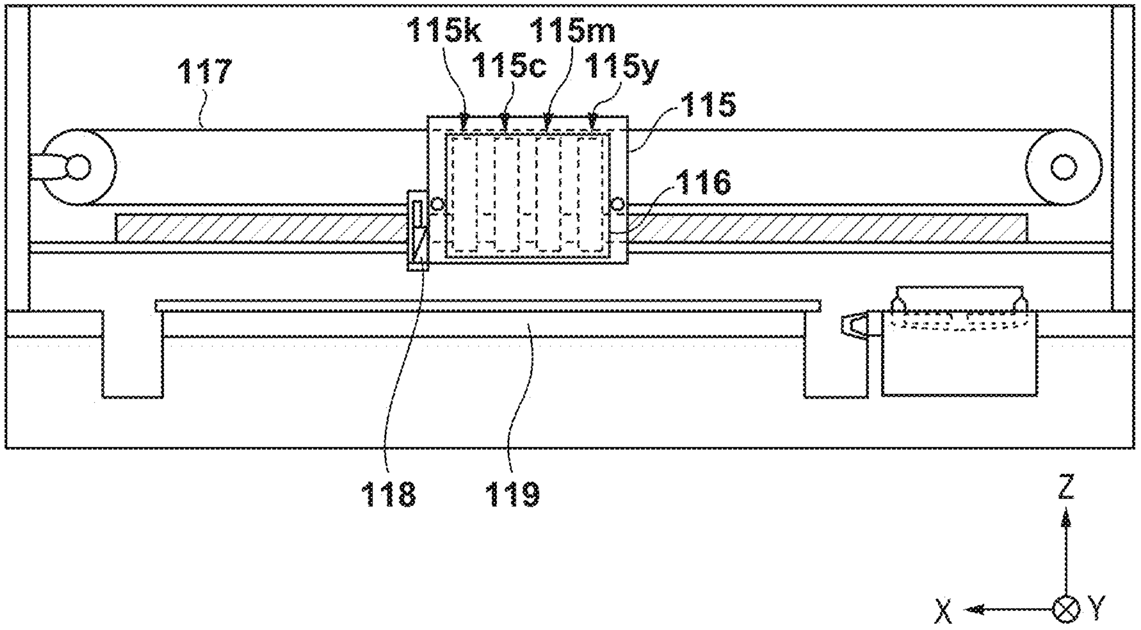
FIG. 16 is a view showing an arrangement on the periphery of a printhead.

FIG. 16 is a view for explaining the printhead 115 according to this embodiment. In this embodiment, an image is printed on a unit area for one nozzle array by N scans. The printhead 115 includes a carriage 116, nozzle arrays 115*k*, 115*c*, 115*m*, and 115*y*, and an optical sensor 118. The carriage 116 on which the four nozzle arrays 115*k*, 115*c*, 115*m*, and 115*y* and the optical sensor 118 are mounted can reciprocally move along the X direction (a main scan direction) in FIG. 16 by the driving force of a carriage motor transmitted via a belt 117. While the carriage 116 moves in the X direction relative to a print medium, ink droplets are discharged from each nozzle of the nozzle arrays in the gravity direction (the −Z direction in FIG. 16) based on print data. Consequently, an image is printed by 1/N of a main scan on the print medium placed on a platen 119. Upon completion of one main scan, the print medium is conveyed along a conveyance direction (the −Y direction in FIG. 16) crossing the main scan direction by a distance corresponding to the width of 1/N of the main scan. These operations print an image having the width of one nozzle array by N scans. An image is gradually formed on the print medium by alternately repeating the main scan and the conveyance operation, as described above. In this way, control is executed to complete image printing in a predetermined area.

There are various types of content information included in image data input from the user. Examples are various types including graphics such as a character, a photograph, and a figure, and gradation as a design expression. Types related to processes (to be described later), such as "emphasis of difference in tint is desirably focused on" and "tint continuity is desirably focused on", can be processed as content information. For example, settings on contents by the user, such as "emphasis of difference in tint is focused on" and "tint continuity is focused on", may be processed as content information. In this case, "emphasis of difference in tint is focused on" corresponds to "character or graphic" below, and "tint continuity is focused on" corresponds to "photograph or gradation" below.

When mapping image data to a color space that can be represented by a printer, if colors existing in the image data are subjected to color degeneration, the user may recognize different colors as identical colors as a print result. If the image data includes "characters and a background formed by a color close to that of the characters", it is undesirable for the user not to be able to read the characters due to color degeneration. The same applies to a graphic. It is desirable to perform "color degeneration correction" for such content so as to reduce the degree of color degeneration after mapping.

On the other hand, since color degeneration correction focuses on ensuring the distance between colors in the limited color space that can be represented by the printer, tint continuity among close colors is reduced as compared with that before color degeneration correction. A "photograph" in the image data includes many portions where a color continuously slightly changes, such as the sky or the skin of a person. However, an attempt is made to ensure the distance between colors by shifting chroma or lightness by performing color degeneration correction, thereby changing the characteristic of the tint continuity. Therefore, an output result undesirable for the user is obtained. The same applies to gradation. It is undesirable to perform "color degeneration correction" for such content after mapping.

Furthermore, various kinds of contents may be mixed in the image data input from the user. By uniformly performing or not performing color degeneration correction for the image data, an output result undesirable for some contents may be obtained. To cope with this, in this embodiment, a content in the image data is analyzed in advance, and it is determined whether the content focuses on maintaining of the color difference. With this arrangement, it is possible to perform color degeneration correction for a content for which it is desirable to perform color degeneration correction, thereby preventing an output result undesirable for some contents from being obtained.

Figure 2:
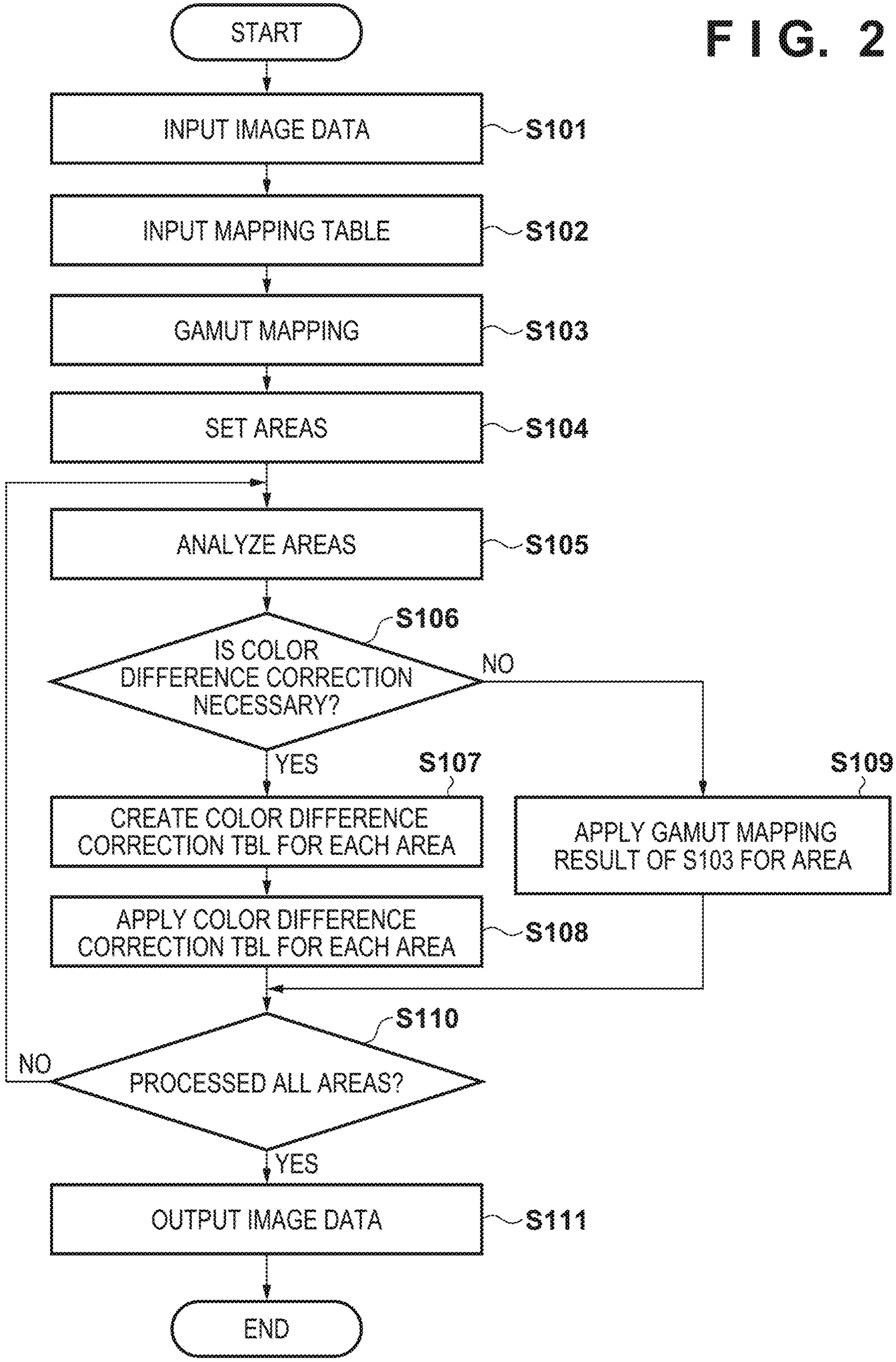
FIG. 2 is a flowchart illustrating image processing.

FIG. 2 is a flowchart illustrating the image processing of the image processing apparatus 101 according to this embodiment. In this embodiment, with respect to a combination of colors subjected to color degeneration, the distance between the colors in a predetermined color space is increased by the processing shown in FIG. 2. As a result, it is possible to reduce the degree of color degeneration. This processing shown in FIG. 2 is implemented when, for example, the CPU 102 reads out a program stored in the storage medium 104 to the RAM 103 and executes the readout program. The processing shown in FIG. 2 may be executed by the image processing accelerator 105.

In step S101, the CPU 102 inputs image data. For example, the CPU 102 inputs image data stored in the storage medium 104. Alternatively, the CPU 102 may input image data via the data transfer I/F 106. The CPU 102 acquires image data including color information from the input original data (acquisition of color information). The image data includes values representing a color expressed in a predetermined color space. In acquisition of the color information, the values representing a color are acquired. The values representing a color are values acquired from sRGB data, Adobe RGB data, CIE-L*a*b* data, CIE-LUV data, XYZ color system data, xyY color system data, HSV data, or HLS data.

In step S102, the CPU 102 acquires a gamut mapping table recorded in advance in the storage medium 104.

In step S103, the CPU 102 performs gamut mapping for the color information of each pixel of the image data using the gamut mapping table acquired in step S102. The image data obtained after gamut mapping is stored in the RAM 103 or the storage medium 104. More specifically, the gamut mapping table is a three-dimensional lookup table. By the three-dimensional lookup table, a combination of output pixel values (Rout, Gout, Bout) can be calculated with respect to a combination of input pixel values (Rin, Gin, Bin). If each of the input values Rin, Gin, and Bin has 256 tones, a table Table1 [256][256][256][3] having 256×256×256=16,777,216 sets of output values in total is preferably used. The CPU 102 performs color conversion using the gamut mapping table. More specifically, color conversion is implemented by performing, for each pixel of the image formed by the RGB pixel values of the original data input in step S101, the following processing given by:

Rout=Table1 [Rin][Gin][Bin][0]. . . (1)

Gout=Table1 [Rin][Gin][Bin][1]. . . (2)

Bout=Table1 [Rin][Gin][Bin][2]. . . (3)

The table size may be reduced by decreasing the number of grids of the LUT from two hundred fifty-six grids to, for example, sixteen grids and deciding output values by interpolating table values of a plurality of grids. Instead of the three-dimensional LUT, a 3×3 matrix operation may be used.

In step S104, the CPU 102 sets areas in the original data input in step S101. Various methods of setting areas are considered. As an example, a method using a white pixel value of the input image as a determination criterion is used.

Figure 3:
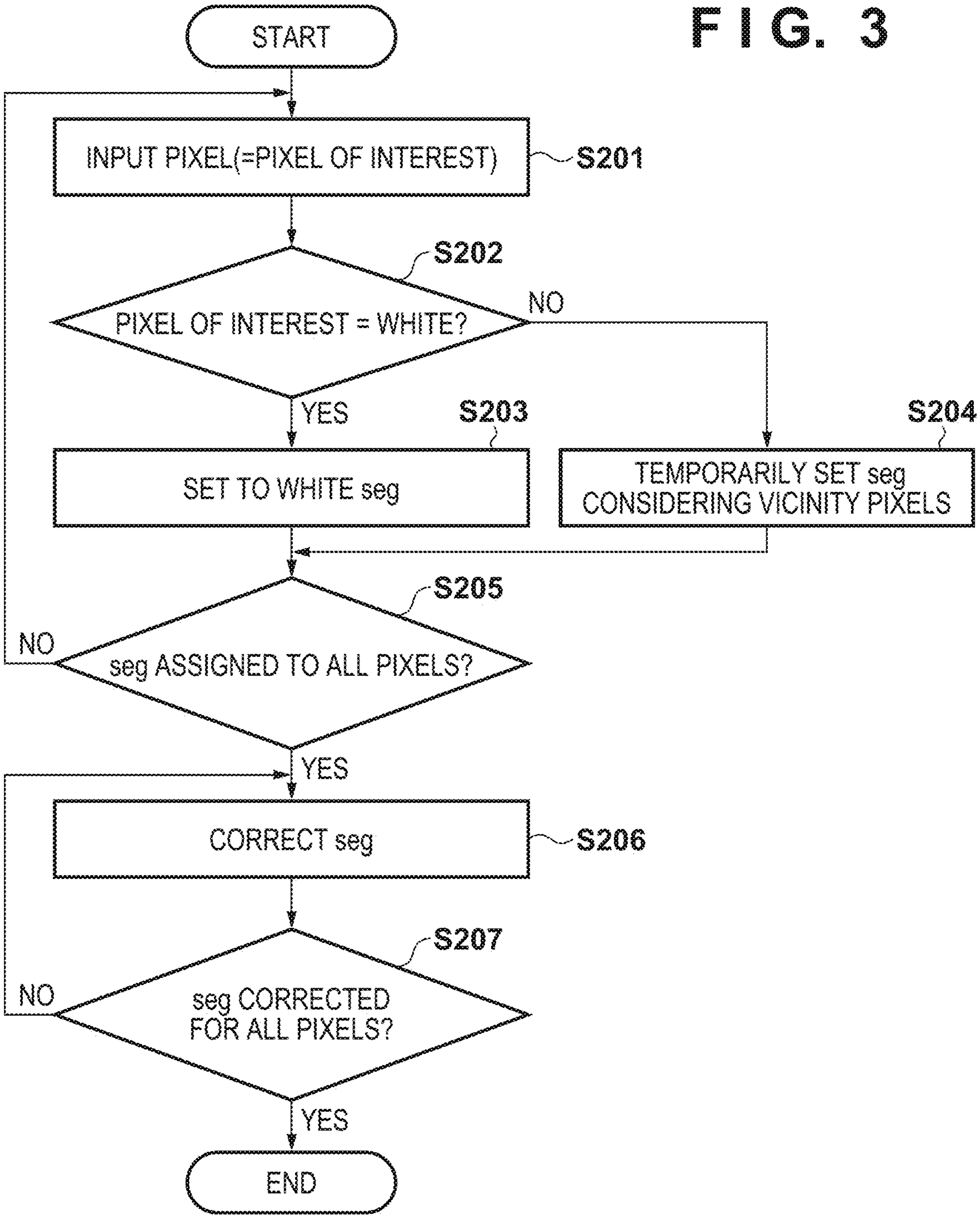
FIG. 3 is a flowchart illustrating area setting processing.

FIG. 3 is a flowchart illustrating area setting processing using a white pixel value as a determination criterion. Information of seg in FIG. 3 indicates each set area, and each area is managed by information of a seg number of 0, 1, 2 . . .

In step S201, the CPU 102 acquires one pixel in the image data. In this flowchart, pixel analysis is performed by setting the pixel as a pixel of interest.

Figure 4A:
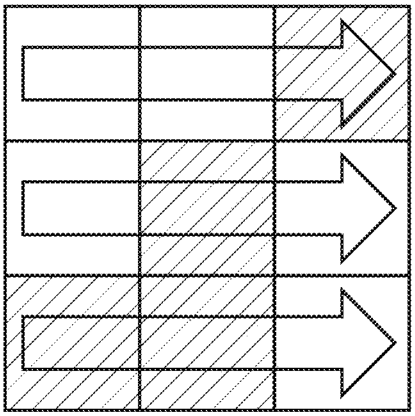
FIGS. 4A to 4C are views for explaining pixel analysis.

Referring to FIG. 4A, rectangular information indicates image data. In the image data, a black pixel is a non-white area and a white pixel is a white area. By scanning the image data in a direction indicated by an arrow, the pixel of interest is changed. With respect to the image data shown in FIG. 4A, the top pixel row is scanned from left to right. Next, the middle pixel row is scanned from left to right, and the bottom pixel row is finally scanned from left to right.

In step S202, it is determined whether the pixel of interest is a white pixel. The white pixel is, for example, a pixel with R=G=B=255 in 8-bit information. In this processing, whether the pixel of interest is a white pixel may be determined after performing the gamut mapping in step S103 or may be determined for a pixel value before performing gamut mapping. If the determination processing is performed for the pixel after performing the gamut mapping, a table which ensures that the pixel with R=G=B=255 holds the values even after the gamut mapping, that is, the pixel remains the white pixel is used. If it is determined that the pixel of interest is a white pixel, the process advances to step S203; otherwise, the process advances to step S204.

In step S203, the CPU 102 sets white seg in the pixel of interest. In this embodiment, seg is represented by a numerical value and white seg=seg number of 0 is set.

In step S204, the CPU 102 temporarily sets a seg number in the pixel of interest. Inspection is performed in the scan direction of the pixels shown in FIG. 4A, and a seg number is temporarily set based on the seg number of the adjacent pixel on the left side of the pixel of interest. In this embodiment, as an example, a seg number is temporarily set under the following rule.

When the adjacent pixel on the left side has a seg number=0, a new seg number is assigned to the pixel of interest.

When the adjacent pixel on the left side has a seg number=N, the seg number=N is assigned to the pixel of interest.

In step S205, the CPU 102 determines whether the temporary seg numbers have been assigned to all the pixels of the image data. If it is determined that the temporary seg numbers have been assigned to all the pixels, the process advances to step S206; otherwise, the processes from step S201 are repeated.

Figure 4B:
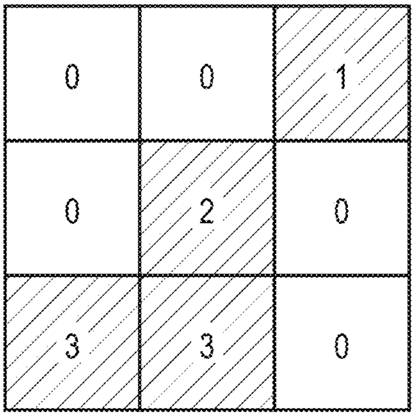

FIG. 4B shows a result of temporarily setting the seg numbers. This shows that the temporary seg numbers of zero to three are assigned within a 3×3 range by the above setting processing.

In step S206, the CPU 102 corrects the temporary seg number. The pixel of interest is corrected in the same scan direction as in FIG. 4A. The CPU 102 compares the seg number of the pixel of interest with the smallest seg number, except for the seg number=0, among the seg numbers of the upper, lower, left, and right pixels, and assigns the smaller seg number as the seg number of the pixel of interest.

In step S207, the CPU 102 determines whether the temporary seg number has been corrected for all the pixels of the image data. If it is determined that the temporary seg number has been corrected for all the pixels, the processing shown in FIG. 3 ends. If it is determined that the temporary seg number has not been corrected for all the pixels, the processes from step S206 are repeated.

Figure 4C:
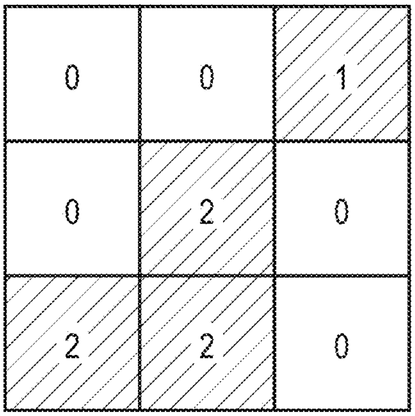

FIG. 4C shows the correction result of the temporary seg numbers. The temporary seg number=3 existing in FIG. 4B is corrected to the temporary seg number=2. The pixels each having the temporary seg number of 0, 1, or 2 have the same numbers.

The above-described area setting processing is merely an example. A pixel other than the white pixel in the pixel information may be set as the criterion of the area setting processing, and determination of the seg number may be implemented by a different procedure. For example, such determination may be performed that all pixels that overlap each other by reducing an area by performing reduction processing in advance have the same seg number. By using the reduction processing, it is possible to shorten the processing time of the area setting processing. Information other than R, G, and B information of the pixel may be used.

In step S105, the CPU 102 analyzes the area set in step S104. This analysis processing is processing of generating information for determining whether to create and apply a color difference correction table in the succeeding stage. In this embodiment, with respect to each area, information indicating “character or graphic” or “photograph or gradation” is generated as determination information.

In this embodiment, by analyzing contents included in the image data, control can be executed to perform color degeneration correction for “character or graphic” and not to perform color degeneration correction for “photograph or gradation”. That is, color degeneration correction is not uniformly performed for the image data, and is performed only for a content for which it is preferable to perform color degeneration correction. With this arrangement, it is possible to reduce a failure of an image caused by uniformly performing color degeneration correction.

Figure 5A:
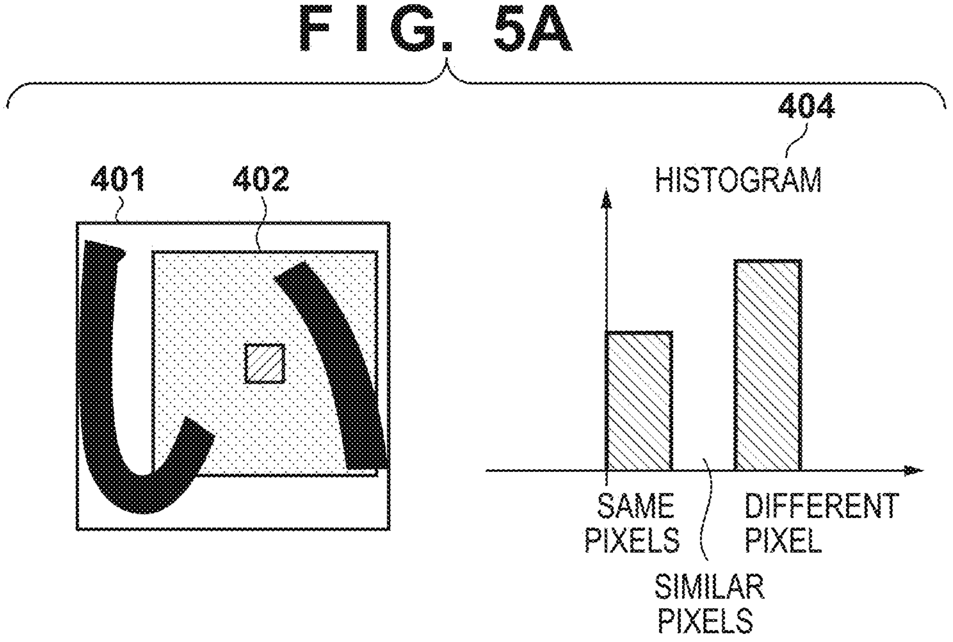
FIGS. 5A to 5C are views for explaining determination of the type of a content.
Figure 5B:
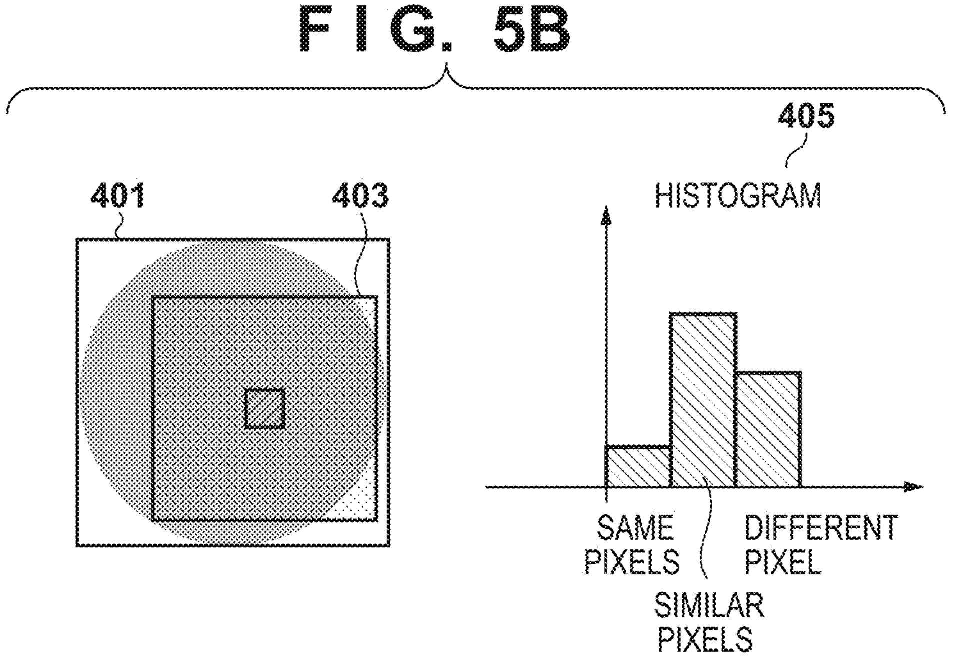
Figure 5C:
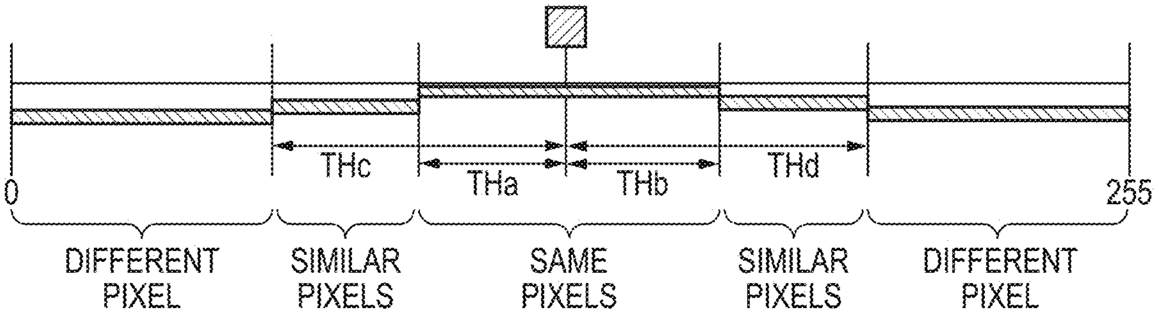

FIGS. 5A to 5C show an example of the analysis processing. In image data shown in FIG. 5A, a state in which a character “\\” is set as one area 400 as a result of executing the area setting processing in step S104 is shown. On the other hand, in image data shown in FIG. 5B, a state in which circular gradation is set as one area 401 as a result of executing the area setting processing in step S104 is shown. Each of the areas 400 and 401 is set as a rectangle to surround the character or the circular gradation. However, if the method exemplified in step S104 is used, the area is divided at the boundary with the white pixel. For the sake of description, with respect to the result of executing the area setting processing in step S104, the rectangular area is set based on the Y-coordinates of the uppermost and lowermost pixels of the area and the X-coordinates of the rightmost and leftmost pixels of the area.

In step S105, the CPU 102 determines the presence/absence of an edge in an hatched area using an edge detection area 402 or 403 having a predetermined area. With respect to the presence/absence of the edge, there are various methods. As an example, a method using “same pixels”, “similar pixels”, and “different pixels” is used here. As shown in FIG. 5C, pixels falling within pixel value ranges THa and THb are classified as same pixels, pixels falling within pixel value ranges THc and THd are classified as similar pixels, and the remaining pixels are classified as different pixels. As a value to be compared with TH, RGB information, YCbCr information, or one-channel (CH) information may be used, and the number of channels and their types are not limited. The values of THa to THd may be changed for each piece of color information. For example, different thresholds may be set for all R, G, and B. By comparing all the pixels in the edge detection area 402 or 403 with the central pixel, the number of same pixels, the number of similar pixels, and the number of different pixels that are included in the edge detection area 402 or 403 are found. With respect to the edge detection area 402 or 403, the entire area 400 or 401 is scanned to create a histogram by accumulating the numbers of same pixels, similar pixels, and different pixels. Since it is necessary to scan the entire area 400 with respect to the central pixel of the edge detection area 402, a range where the end portion of the edge detection area 402 is outside the area 400 can be a scan target. A range where the end portion of the edge detection area 403 is outside the area 401 can also be a scan target.

A histogram 404 corresponds to FIG. 5A, and a histogram 405 corresponds to FIG. 5B. Therefore, it is found that the number of same pixels and the number of different pixels are large and the number of similar pixels is small with respect to “>” shown in FIG. 5A. Furthermore, it is found that the circular gradation shown in FIG. 5B includes a large number of similar pixels, as a comparison result.

By a frequency distribution as the result of the histogram, the area can be classified into “character or graphic” or "photograph or gradation". Since "character or graphic" can be determined in a case when the number of similar pixels is low, the area is classified by setting thresholds for the same pixels, similar pixels, and different pixels. For example, based on whether a condition given by expression (4) below is satisfied, the CPU 102 determines whether the area is "character or graphic".

number of same pixels >TH_same && number of similar pixels <TH near && number of different pixels >TH_other. (4)

This analysis processing is merely an example, and the method is not limited to the above one. For example, the number of pixels as a determination result may be converted into an area ratio of the area and compared using expression (4). Furthermore, in this embodiment, edge detection using the edge detection area 402 or 403 is used for the determination processing but the determination processing may be performed based on a color distribution in the area. Thresholds may appropriately be set here. This arrangement will be described in the sixth embodiment and subsequent embodiments.

In step S106, the CPU 102 performs processing of determining for each area whether color degeneration correction is necessary. For this determination processing, the information of "character or graphic" or "photograph or gradation" determined in step S105 is used. In this embodiment, if the area is "character or graphic", it is determined that color degeneration correction is necessary, and the process advances to step S107. On the other hand, if the area is "photograph or gradation", it is determined that color degeneration correction is unnecessary, and the process advances to step S109.

In step S107, using the image data input in step S101, the gamut mapping table acquired in step S102, and the image data obtained after performing the gamut mapping in step S103, the CPU 102 creates a color degeneration-corrected table. The color degeneration-corrected table is created for each area divided in step S104. Note that the form of the color degeneration-corrected table is the same as the form of the gamut mapping table.

In step S108, the CPU 102 generates area data having undergone color degeneration correction by performing an operation for the area data of the corresponding area in the image data input in step S101 using the color degeneration-corrected table created in step S107. The generated color degeneration-corrected area data is stored in the RAM 103 or the storage medium 104. In step S109, the CPU 102 stores, as area data, the result obtained after the gamut mapping in step S103 in the RAM 103 or the storage medium 104.

With respect to the area data determined as "photograph or gradation", the gamut mapping table may be switched to that for "photograph or gradation". It is possible to perform color conversion using the characteristic of each content by applying, to "character or graphic", the table that emphasizes a difference in tint and applying, to "photograph or gradation", the table that focuses on tint continuity. To maintain tint continuity, the gamut mapping table need not be applied to the area of "photograph or gradation". By not applying the gamut mapping table to some contents, the effect of reducing the memory capacity is obtained. Similarly, the table length of the gamut mapping table may be changed in accordance with the content and the table may be replaced by a simple form such as a unique conversion coefficient, thereby similarly obtaining the effect of reducing the memory capacity.

In step S110, the CPU 102 determines whether all the areas of the image data have been processed. If it is determined that all the areas have been processed, the process advances to step S111. Otherwise, the processes from step S105 are repeated.

In step S111, the CPU 102 outputs the color degeneration-corrected area data stored in step S108 or the result after the gamut mapping stored in step S109 from the image processing apparatus 101 via the data transfer I/F 106. The gamut mapping may be mapping from the sRGB color space to the color reproduction gamut of the printing apparatus 108. In this case, it is possible to suppress decreases in chroma and color difference caused by the gamut mapping to the color reproduction gamut of the printing apparatus 108.

Figure 6:
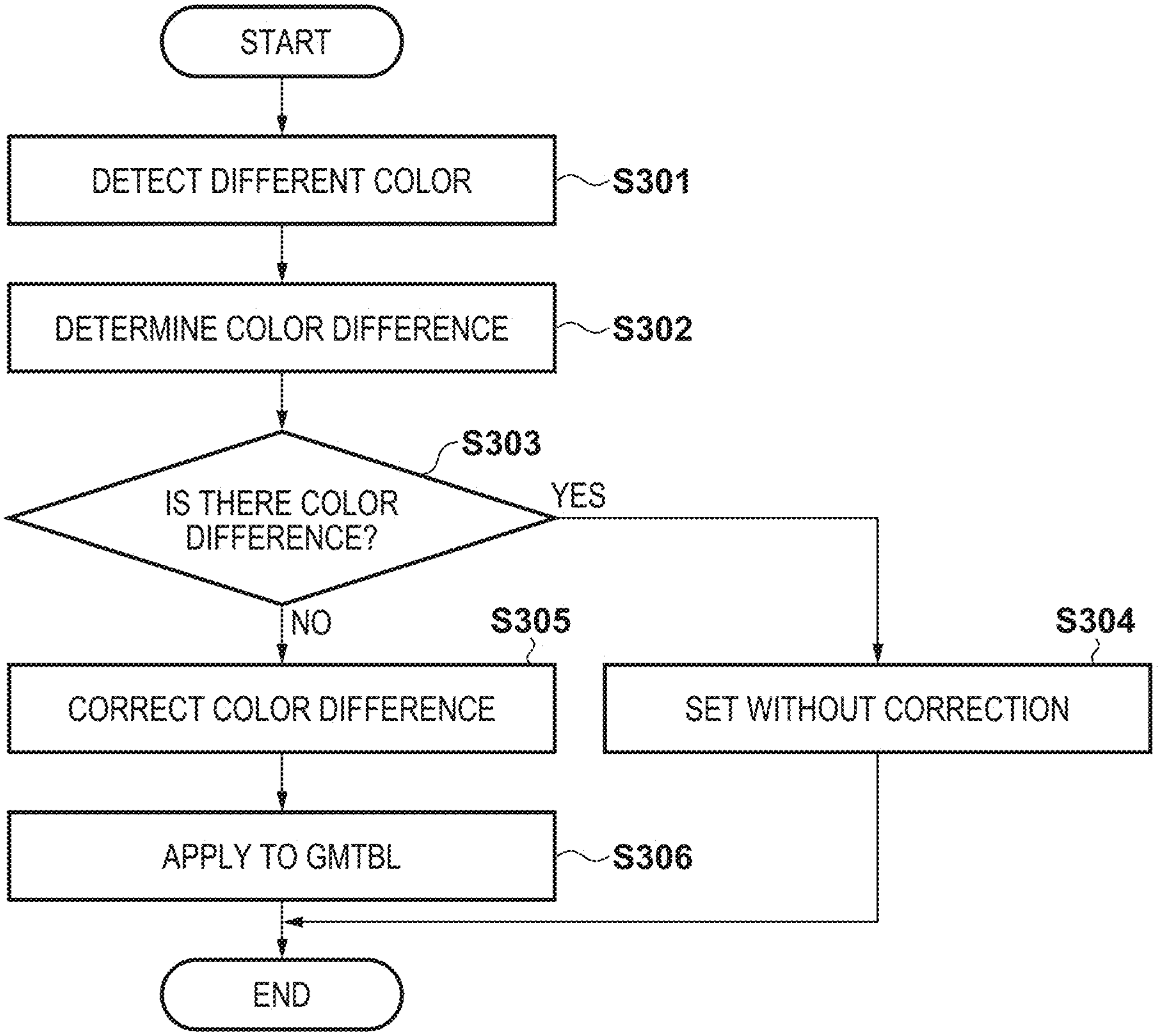
FIG. 6 is a flowchart illustrating processing of creating a color degeneration-corrected table.

The color degeneration-corrected table creation processing in step S107 will be described in detail with reference to FIG. 6. The processing shown in FIG. 6 is implemented when, for example, the CPU 102 reads out a program stored in the storage medium 104 to the RAM 103 and executes the readout program. The processing shown in FIG. 6 may be executed by the image processing accelerator 105.

In step S301, the CPU 102 detects unique colors existing in each area. In this embodiment, the term "unique color" indicates a color used in image data. For example, in a case of black text data with a white background, unique colors are white and black. Furthermore, for example, in a case of an image such as a photograph, unique colors are colors used in the photograph. The CPU 102 stores the detection result as a unique color list in the RAM 103 or the storage medium 104. The unique color list is initialized at the start of step S301. The CPU 102 repeats the detection processing for each pixel of the image data, and determines, for all the pixels included in a target object, whether the color of each pixel is different from unique colors detected until now. If it is determined that the color of the pixel is determined as a unique color, this color is stored as a unique color in the unique color list.

As a determination method, it is determined whether the color of the target pixel is a color included in the created unique color list. In a case when it is determined that the color is not included in the list, color information is newly added to the unique color list. In this way, the unique color list included in the area can be detected. For example, if the input image data is sRGB data, each of the input values has 256 tones, and thus 256×256×256=16,777,216 unique colors in total are detected. In this case, the number of colors is enormous, thereby decreasing the processing speed. Therefore, the unique colors may be detected discretely. For example, the two hundred fifty-six tones may be reduced to sixteen tones, and then unique colors may be detected. If the number of colors is reduced, colors may be reduced to the colors of the closest grids. In this way, it is possible to detect 16× 16×16=4,096 unique colors in total, thereby improving the processing speed.

Figure 7:
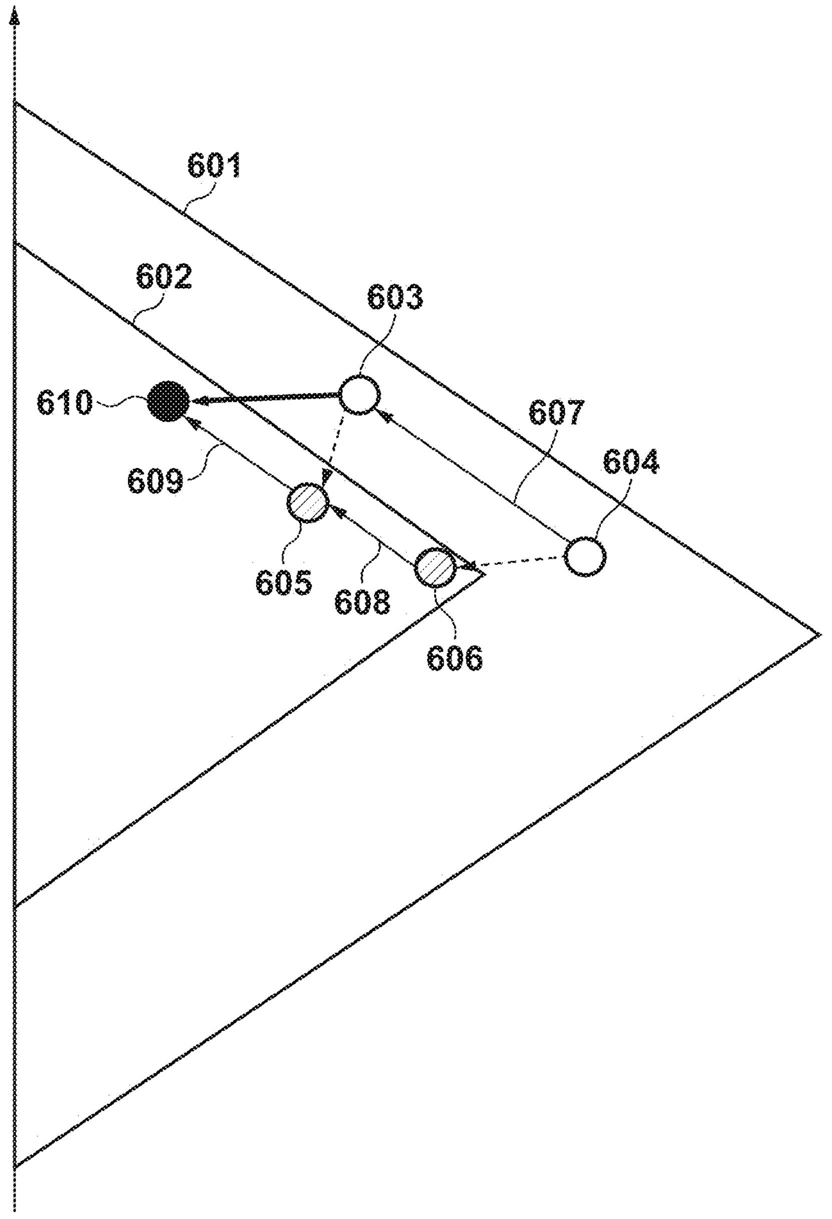
FIG. 7 is a view for explaining color degeneration.

In step S302, based on the unique color list detected in step S301, the CPU 102 detects the number of combinations of colors subjected to color degeneration, among the combinations of the unique colors existing in the area. FIG. 7 is a view for explaining color degeneration. A color gamut 601 is the color gamut of the input image data. A color gamut 602 is a color gamut after the gamut mapping in step S103. In other words, the color gamut 602 corresponds to the color gamut of the device. Colors 603 and 604 are included in the input image data. A color 605 is a color obtained by performing the gamut mapping for the color 603. A color 606 is a color obtained by performing the gamut mapping for the color 604. In a case when a color difference 608 between the colors 605 and 606 is less than a color difference 607 between the colors 603 and 604, it is determined that color degeneration has occurred. The CPU 102 repeats the determination processing the number of times that is equal to the number of combinations of the colors in the unique color list. As a color difference calculation method, a Euclidean distance in a color space is used. In this embodiment, as a preferred example, a Euclidean distance (to be referred to as a color distance ΔE hereinafter) in the CIE-L*a*b* color space is used. Since the CIE-L*a*b* color space is a visual uniform color space, the Euclidean distance can be approximated into the change amount of the color. Therefore, a person perceives that the colors become closer as the Euclidean distance on the CIE-L*a*b* color space is less and that the colors are farther apart as the Euclidean distance is larger. In a case when the input data is not CIE-L*a*b* data, color space conversion is performed. As color space conversion at this time, well-known processing may be used. The color information in the CIE-L*a*b* color space is represented in a color space with three axes of L*, a*, and b *. For example, the color 603 is represented by L603, a603, and b603. The color 604 is represented by L604, a604, and b604. The color 605 is represented by L605, a605, and b605. The color 606 is represented by L606, a606, and b606. If the input image data is represented in another color space, it is converted into the CIE-L*a*b* color space using a well-known method. The color difference ΔE 607 and the color difference ΔE 608 are calculated by:

$$\Delta E_{607} = \sqrt{(L_{603} - L_{604})^2 + (a_{603} - a_{604})^2 + (b_{603} - b_{604})^2} \tag{5}$$

$$\Delta E_{608} = \sqrt{(L_{605} - L_{606})^2 + (a_{605} - a_{606})^2 + (b_{605} - b_{606})^2} \tag{6}$$

In a case when the color difference ΔE 608 is smaller than the color difference ΔE 607, the CPU 102 determines that color degeneration has occurred. Furthermore, in a case when the color difference ΔE 608 does not have such magnitude that a color difference can be identified, the CPU 102 determines that color degeneration has occurred. This is because, if there is such color difference between the colors 605 and 606 that the colors can be identified as different colors based on the human visual characteristic, it is unnecessary to correct the color difference. In terms of the visual characteristic, 2.0 may be used as the color difference ΔE with which the colors can be identified as different colors. That is, in a case when the color difference ΔE 608 is smaller than the color difference ΔE 607 and is smaller than 2.0, it may be determined that color degeneration has occurred.

In step S303, the CPU 102 determines whether the number of combinations of colors that have been determined in step S302 to be subjected to color degeneration is zero. If it is determined that the number of combinations of colors that have been determined to be subjected to color degeneration is zero, that is, there is a color difference, the process advances to step S304, and the CPU 102 determines that the area requires no color degeneration correction, ends the processing shown in FIG. 6, and advances to step S108. On the other hand, if it is determined in step S303 that the number of combinations of colors that have been determined to be subjected to color degeneration is not zero, that is, there is no color difference, the process advances to step S305, and color degeneration correction (color difference correction) is performed.

Since color degeneration correction changes the colors, the combinations of colors not subjected to color degeneration are also changed, which is unnecessary. Therefore, based on, for example, a ratio between the total number of combinations of the unique colors and the number of combinations of the colors subjected to color degeneration, it may be determined whether color degeneration correction is necessary. More specifically, in a case when the majority of all the combinations of the unique colors are combinations of the colors subjected to color degeneration, it may be determined that color degeneration correction is necessary. This can suppress a color change caused by excessive color degeneration correction.

In step S305, based on the input image data, the image data having undergone the gamut mapping, and the gamut mapping table, the CPU 102 performs color degeneration correction for the combinations of the colors subjected to color degeneration.

Color degeneration correction will be described in detail with reference to FIG. 7. The colors 603 and 604 are input colors included in the input image data. The color 605 is a color obtained after performing color conversion for the color 603 by the gamut mapping. The color 606 is a color obtained after performing color conversion for the color 604 by the gamut mapping. Referring to FIG. 7, the combination of the colors 603 and 604 represents color degeneration. The distance between the colors 605 and 606 on the predetermined color space is increased, thereby correcting color degeneration. More specifically, correction processing is performed to increase the distance between the colors 605 and 606 to a distance equal to or greater than the distance with which the colors can be identified as different colors based on the human visual characteristic. In terms of the visual characteristic, as the distance between the colors with which the colors can be identified as different colors, the color difference ΔE is set to 2.0 or more. More preferably, the color difference between the colors 605 and 606 is desirably equal to the color difference ΔE 607. The CPU 102 repeats the color degeneration correction processing the number of times that is equal to the number of combinations of the colors subjected to color degeneration. As a result of performing color degeneration correction the number of times that is equal to the number of combinations of the colors, the color information before correction and color information after correction are held in a table. In FIG. 7, the color information is color information in the CIE-L*a*b* color space. Therefore, the input image data may be converted into the color space of the image data at the time of output. In this case, color information before correction in the color space of the input image data and color information after correction in the color space of the output image data are held in a table.

Next, the color degeneration correction processing will be described in detail. A color difference correction amount 609 that increases the color difference ΔE is obtained from the color difference ΔE 608. In terms of the visual characteristic, the difference between the color difference ΔE 608 and 2.0 which is the color difference ΔE with which the colors can be recognized as different colors is the color difference correction amount 609. More preferably, the difference between the color difference ΔE 607 and the color difference ΔE 608 is the color difference correction amount 609. As a result of correcting the color 605 by the color difference correction amount 609 on an extension from the color 606 to the color 605 in the CIE-L*a*b color space, a color 610 is obtained. The color 610 is separated from the color 606 by a color difference obtained by adding the color difference ΔE

608 and the color difference correction amount 609. The color 610 is on the extension from the color 606 to the color 605 but this embodiment is not limited to this. As long as the color difference ΔE between the colors 606 and 610 is equal to the color difference obtained by adding the color difference ΔE 608 and the color difference correction amount 609, the direction can be any of the lightness direction, the chroma direction, and the hue angle direction in the CIE-L*a*b* color space. Not only one direction but also any combination of the lightness direction, the chroma direction, and the hue angle direction may be used. Furthermore, in the above example, color degeneration is corrected by changing the color 605 but the color 606 may be changed. Alternatively, both the colors 605 and 606 may be changed. If the color 606 is changed, the color 606 cannot be changed outside the color gamut 602, and thus the color 606 is moved and changed on the boundary surface of the color gamut 602. In this case, with respect to the shortage of the color difference ΔE, color degeneration correction may be performed by changing the color 605.

In step S306, the CPU 102 changes the gamut mapping table using the result of the color degeneration correction processing in step S305. The gamut mapping table before the change is a table for converting the color 603 as an input color into the color 605 as an output color. In accordance with the result of step S305, the table is changed to a table for converting the color 603 as an input color into the color 610 as an output color. In this way, the color degeneration-corrected table can be created. The CPU 102 repeats the processing of changing the gamut mapping table the number of times that is equal to the number of combinations of the colors subjected to color degeneration.

As described above, by applying the color degeneration-corrected gamut mapping table to the application target area of the input image data, it is possible to perform correction of increasing the distance between the colors for each of the combinations of the colors subjected to color degeneration, among the combinations of the unique colors included in the area. As a result, it is possible to efficiently reduce color degeneration with respect to the combinations of the colors subjected to color degeneration. For example, assume that if the input image data is sRGB data, the gamut mapping table is created on the premise that the input image data has 16,777,216 colors. The gamut mapping table created on this premise is created in consideration of color degeneration and chroma even for colors not actually included in the input image data. In this embodiment, it is possible to adaptively correct the gamut mapping table with respect to the area data by detecting the colors of the area data. Then, it is possible to create the gamut mapping table for the colors of the area data. As a result, it is possible to perform preferred adaptive gamut mapping for the area data, thereby efficiently reducing color degeneration.

In this embodiment, areas are set in the input image data, and analysis is performed for each set area. Then, it is determined whether to perform color degeneration correction using an analysis result, and, in a case when it is determined to perform color degeneration correction, color degeneration correction is performed. The purpose of performing color degeneration correction is to reduce color degeneration caused by the gamut mapping. In information of a character or a graphic, not colors but described contents (the meaning of the characters or the shape of the graphic) are important. Therefore, if the user cannot recognize the characters or the shape of the graphic after printing by decreasing the distance between colors, visibility and readability of the contents deteriorate. To cope with this, in the case of the character or graphic, color degeneration correction is performed. On the other hand, in information of a photograph or gradation, colors themselves are often important. For example, in a photograph of a person, even if the distance between the color of the skin of the person and the color of a wall on the background in the color space is small, it is undesirable for the user to correct the color of the skin to another color. Gradation of continuous tones has the meaning of designability. However, if the distance between colors of continuous tones in the color space is corrected to generate a gradation level difference, designability deteriorates, which is undesirable for the user. The area analysis and the color degeneration correction determination processing according to this embodiment aim at determining the user's intention (the meaning of data) based on the characteristic of the image data input from the user. According to this embodiment, it is possible to perform appropriate gamut mapping for each area in accordance with the color degeneration correction determination result.

In this embodiment, the processing in a case when the input image data includes one page has been explained. The input image data may include a plurality of pages. If the input image data includes a plurality of pages, the processing procedure shown in FIG. 2 may be performed for all the pages or the processing shown in FIG. 2 may be performed for each page. As described above, even if the input image data includes a plurality of pages, it is possible to reduce the degree of color degeneration caused by gamut mapping.

In this embodiment, a plurality of areas are set from the input image data but whether to perform color degeneration correction may be determined for the whole image. In this case, instead of setting a plurality of areas, "character or graphic" or "photograph or gradation" is determined for the whole image.

In this embodiment, classification is performed into two types of "character or graphic" or "photograph or gradation", but classification contents are not limited to this. For example, since a gray line (a pixel value on a gray axis from white to black), a black point, and a white point in the input image cannot deviate from the gray line by performing color degeneration correction, color degeneration correction need not be performed for them. For example, the printer may discharge only K ink for the input gray line portion, and control of a method of using ink may be changed by deviating from the gray line. Therefore, whether to perform color degeneration correction may be determined using a result of analyzing gray line information.

In this embodiment, the color degeneration-corrected gamut mapping table is applied to the input image but a correction table for performing color degeneration correction may be created for the image data having undergone gamut mapping. In this case, based on the result of the color degeneration correction processing in step S305, a correction table for converting color information before correction into color information after correction may be generated. The generated correction table is a table for converting the color 605 into the color 610 in FIG. 7. In step S108, the CPU 102 applies the generated correction table to the image data having undergone the gamut mapping. As described above, it is possible to reduce, by correcting the image data having undergone the gamut mapping, the degree of color degeneration caused by the gamut mapping. Furthermore, after applying the color degeneration-corrected gamut mapping table to each area of the input image, a unique gamut mapping table may be applied to the whole image, thereby obtaining an output gamut. For example, overall color adjustment and the like may be performed after the processing of this embodiment. In this case, with respect to evaluation of the distance between colors and the color degeneration correction amount/direction in color degeneration correction, it is considered that the gamut mapping table is applied after the color degeneration correction.

Figure 17:
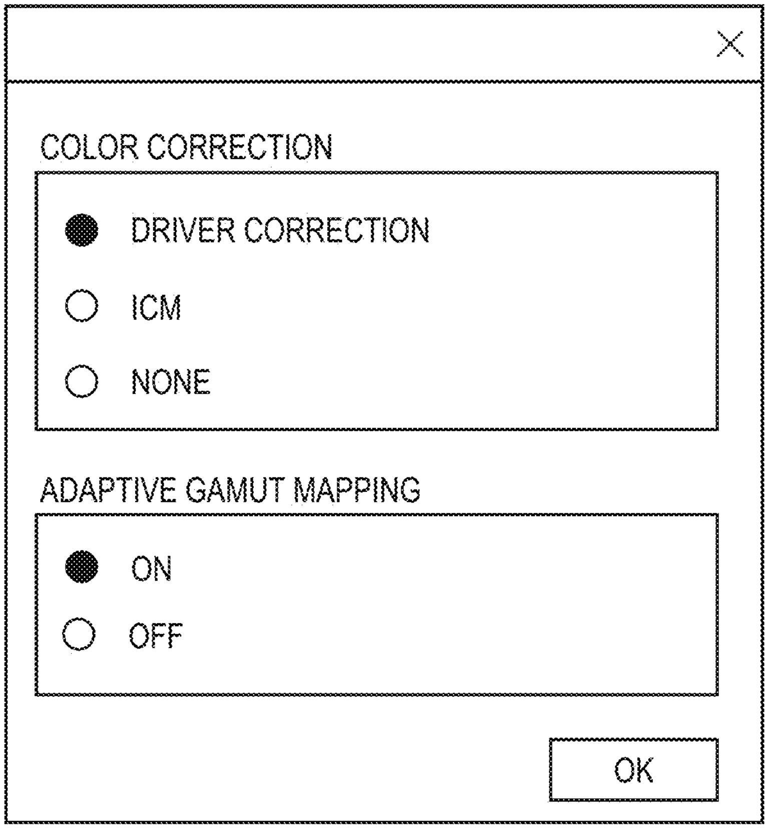
FIG. 17 is a view showing a UI screen.

In this embodiment, the user may be able to input an instruction indicating whether to execute the color degeneration correction processing. In this case, a UI screen shown in FIG. 17 may be displayed on a display unit (not shown) mounted on the image processing apparatus 101 or the printing apparatus 108, thereby making it possible to accept a user instruction. On the UI screen shown in FIG. 17, it is possible to prompt the user to select a color correction type by a toggle button. Furthermore, it is possible to prompt the user to select, by a toggle button, ON/OFF of whether to execute "adaptive gamut mapping" indicating the processing described in this embodiment. With this arrangement, it is possible to switch, in accordance with the user instruction, whether to execute adaptive gamut mapping. As a result, when the user wants to reduce the degree of color degeneration, the gamut mapping described in this embodiment can be executed.

Second Embodiment

The second embodiment will be described below concerning points different from the first embodiment. The first embodiment has explained that color degeneration correction is performed for a single color in step S305. Therefore, depending on combinations of colors of the input image data, a tint may change while reducing the degree of color degeneration. More specifically, if color degeneration correction is performed for two colors having different hue angles, and the color is changed by changing the hue angle, a tint is different from the tint of the color in the input image data. For example, if color degeneration correction is performed for blue and purple by changing a hue angle, purple is changed into red. If a tint changes, this may cause the user to recall a failure of an apparatus such as an ink discharge failure.

Furthermore, in the first embodiment, color degeneration correction is repeated the number of times that is equal to the number of combinations of the unique colors of the input image data. Therefore, the distance between the colors can be increased reliably. However, if the number of unique colors of the input image data increases, as a result of changing the color to increase the distance between the colors, the distance between the changed color and another unique color may be decreased. To cope with this, the CPU 102 needs to repeatedly execute color degeneration correction in step S305 so as to have expected distances between colors with respect to all the combinations of the unique colors of the input image data. Since the amount of processing of increasing the distance between colors is enormous, the processing time increases.

To cope with this, in this embodiment, color degeneration correction is performed in the same direction for every predetermined hue angle by setting a plurality of unique colors as one color group. To perform correction by setting a plurality of unique colors as one color group, in this embodiment, a unique color (to be described later) as a reference is selected from the color group. Furthermore, by limiting the correction direction to the lightness direction, it is possible to suppress a change of a tint. By performing correction in the lightness direction by setting the plurality of unique colors as one color group, it is unnecessary to perform processing for all the combinations of the colors of input image data, thereby reducing the processing time.

Figure 13:
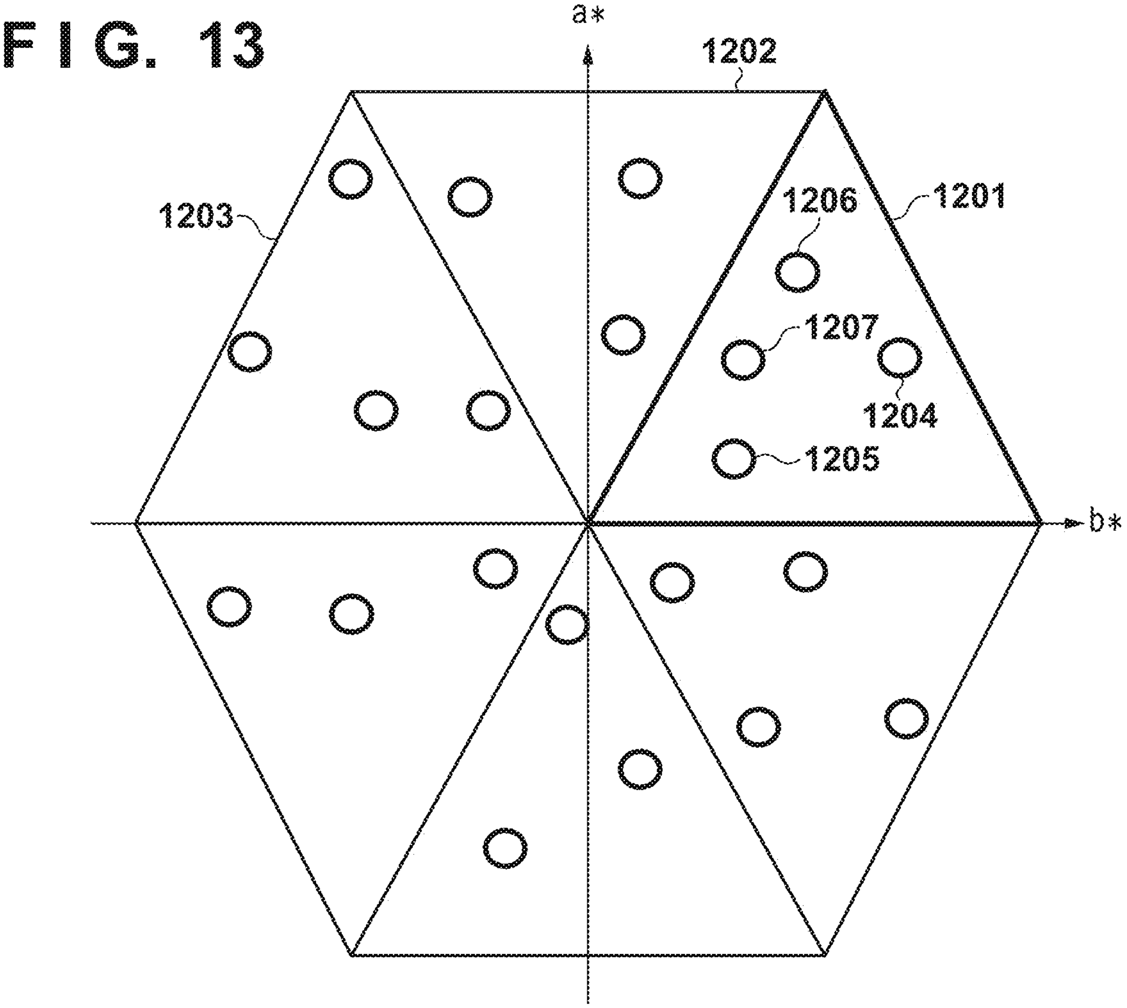
FIG. 13 is a view for explaining color degeneration determination processing in step S302.

FIG. 13 is a view for explaining color degeneration determination processing in step S302 according to this embodiment. FIG. 13 is a view showing, as a plane, two axes of the a* axis and the b* axis in the CIE-L*a*b* color space. A hue range 1201 indicates a range within which a plurality of unique colors within the predetermined hue angle are set as one color group. Referring to FIG. 13, since a hue angle of 360° is divided by 6, the hue range 1201 indicates a range of 0° to 60°. The hue range is preferably a hue range within which colors can be recognized as identical colors. For example, the hue angle in the CIE-L*a*b* color space is decided in a unit of 30° to 60°. If the hue angle is decided in a unit of 60°, six colors of red, green, blue, cyan, magenta, and yellow can be divided. If the hue angle is decided in a unit of 30°, division is possible by a color between the colors divided in a unit of 60°. The hue range may be decided fixedly, as shown in FIG. 13. Alternatively, the hue range may be decided dynamically in accordance with the unique colors included in the input image data.

A CPU 102 detects the number of combinations of colors subjected to color degeneration, similar to the first embodiment, with respect to the combinations of the unique colors of the input image data within the hue range 1201. Referring to FIG. 13, colors 1204, 1205, 1206, and 1207 indicate input colors. In this case, the CPU 102 determines whether color degeneration has occurred for combinations of the four colors 1204, 1205, 1206, and 1207. The CPU 102 repeats this processing for all the hue ranges. As described above, the number of combinations of the colors subjected to color degeneration is detected for each hue range.

In FIG. 13, for example, six is detected as the number of combinations of the colors. In this embodiment, the hue range is decided for every hue angle of 60° but the present invention is not limited to this. For example, the hue range may be decided for every hue angle of 30° or the hue range may be decided without equally dividing the angle. The hue angle range is preferably decided as a hue range so as to obtain visual uniformity. With this arrangement, colors in the same color group are visually perceived as identical colors, and thus it is possible to perform color degeneration correction for the identical colors. Furthermore, the number of combinations of the colors subjected to color degeneration may be detected for each hue range within a hue range including two adjacent hue ranges.

Figure 14:
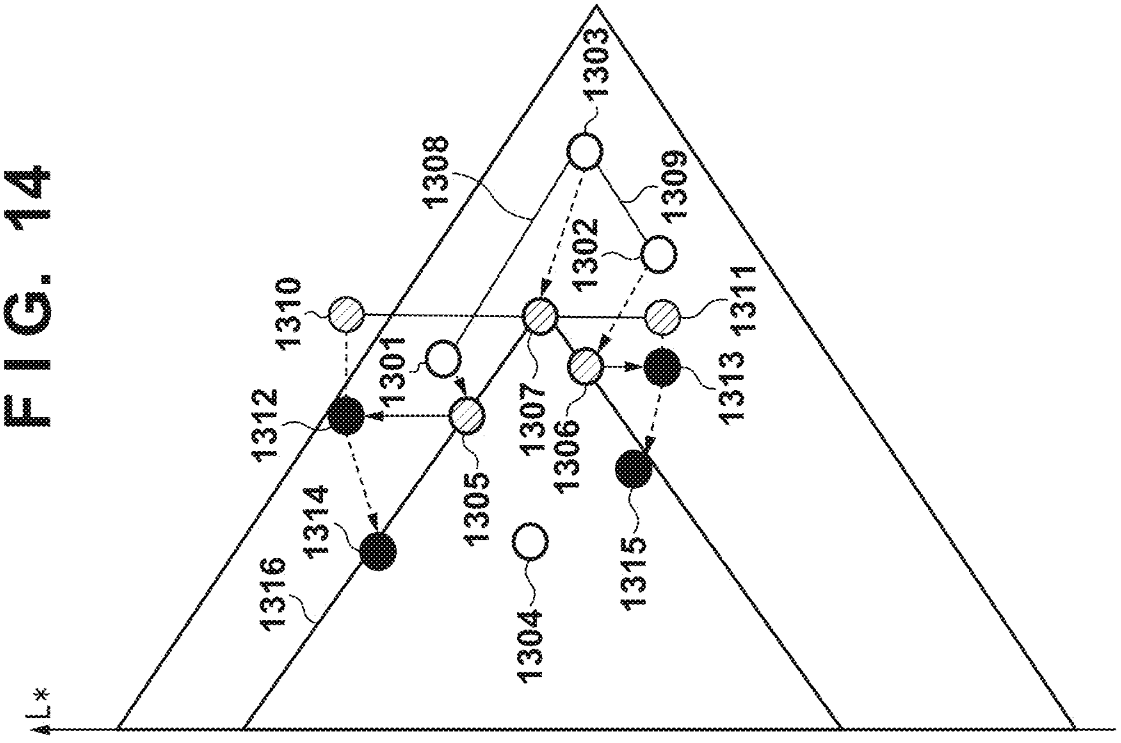
FIG. 14 is a view for explaining color degeneration correction processing in step S305.

FIG. 14 is a view for explaining the color degeneration correction processing in step S305 according to this embodiment. FIG. 14 is a view showing, as a plane, two axes of the L* axis and the C* axis in the CIE-L*a*b* color space. L* represents lightness and C* represents chroma. In FIG. 14, colors 1301, 1302, 1303, and 1304 are input colors. The colors 1301, 1302, 1303, and 1304 indicate colors included in the hue range 1201 in FIG. 13. A color 1305 is a color obtained after performing color conversion for the color 1301 by gamut mapping. A color 1306 is a color obtained after performing color conversion for the color 1302 by gamut mapping. A color 1307 is a color obtained after performing color conversion for the color 1303 by gamut mapping. The color 1304 indicates that the color obtained after performing color conversion by gamut mapping is the same color.

First, the CPU 102 decides a unique color (reference color) as the reference of the color degeneration correction processing for each hue range. In this embodiment, the maximum lightness color, the minimum lightness color, and the maximum chroma color are decided as reference colors.

In FIG. 14, the color 1301 is the maximum lightness color, the color 1302 is the minimum lightness color, and the color 1303 is the maximum chroma color.

Next, the CPU 102 calculates, for each hue range, a correction ratio R from the number of combinations of the unique colors and the number of combinations of the colors subjected to color degeneration within the target hue range. A preferred calculation formula is given by:

correction ratio R=number of combinations of colors subjected to color degeneration/number of combinations of unique colors. (7)

The correction ratio R is lower as the number of combinations of the colors subjected to color degeneration is less, and is higher as the number of combinations of the colors subjected to color degeneration is greater. As described above, as the number of combinations of the colors subjected to color degeneration is greater, color degeneration correction can be performed more strongly. FIG. 14 shows an example in which there are four colors within the hue range 1201 in FIG. 13. Therefore, there are six combinations of the unique colors. For example, among the six combinations, there are four combinations of the colors subjected to color degeneration. In this case, the correction ratio is 0.667. FIG. 14 shows an example in which color degeneration has occurred for all the combinations due to gamut mapping. However, even after color conversion by gamut mapping, the color difference is greater than the identifiable smallest color distance, the combination of the colors is not included as the combination of colors subjected to color degeneration. Thus, the combination of the colors 1304 and 1303 and the combination of the colors 1304 and 1302 are not included as the combinations of colors subjected to color degeneration. The identifiable smallest color difference ΔE is, for example, 2.0.

Next, the CPU 102 calculates, for each hue range, a correction amount based on the correction ratio R and pieces of color information of the maximum lightness, the minimum lightness, and the maximum chroma. The CPU 102 calculates, as correction amounts, a correction amount Mh on a side brighter than the maximum chroma color and a correction amount Ml on a side darker than the maximum chroma color. Similar to the first embodiment, the color information in the CIE-L*a*b* color space is represented in a color space with three axes of L*, a*, and b *. The color 1301 as the maximum lightness color is represented by L1301, a1301, and b1301. The color 1302 as the minimum lightness color is represented by L1302, a1302, and b1302. The color 1303 as the maximum chroma color is represented by L1303, a1303, and b1303. The preferred correction amount Mh is a value obtained by multiplying the color difference ΔE between the maximum lightness color and the maximum chroma color by the correction ratio R. The preferred correction amount Ml is a value obtained by multiplying the color difference ΔE between the maximum chroma color and the minimum lightness color by the correction ratio R. The correction amounts Mh and Ml are calculated by:

$$Mh = \sqrt{(L_{1301} - L_{1303})^2 + (a_{1301} - a_{1303})^2 + (b_{1301} - b_{1303})^2} \times R \tag{8}$$

$$Ml = \sqrt{(L_{1302} - L_{1303})^2 + (a_{1302} - a_{1303})^2 + (b_{1302} - b_{1303})^2} \times R \tag{9}$$

As described above, the color difference ΔE to be held after gamut mapping is calculated. The color difference ΔE to be held after gamut mapping is the color difference ΔE before gamut mapping. In FIG. 14, the correction amount Mh is a value obtained by multiplying a color difference 1308 by the correction ratio R, and the correction amount Ml is a value obtained by multiplying a color difference ΔE 1309 by the correction ratio R. Furthermore, if the color difference ΔE before gamut mapping is larger than the identifiable smallest color difference, the color difference ΔE to be held need only be greater than the identifiable smallest color difference ΔE. By performing the processing in this way, it is possible to recover the color difference ΔE, that has decreased due to gamut mapping, to the identifiable color difference ΔE. The color difference ΔE to be held may be the color difference ΔE before gamut mapping. In this case, it is possible to make identifiability close to that before gamut mapping. The color difference ΔE to be held may be greater than the color difference before gamut mapping. In this case, it is possible to improve identifiability, as compared with identifiability before gamut mapping.

Next, the CPU 102 generates a lightness correction table for each hue range. The lightness correction table is a table for expanding lightness between colors in the lightness direction based on the lightness of the maximum chroma color and the correction amounts Mh and Ml. In FIG. 14, the lightness of the maximum chroma color is lightness L1303 of the color 1303. The correction amount Mh is a value based on the color difference ΔE 1308 and the correction ratio R. The correction amount Ml is a value based on the color difference ΔE 1309 and the correction ratio R. A method of creating a lightness correction table for expanding lightness in the lightness direction will be described below.

The lightness correction table is a 1DLUT. In the 1DLUT, input lightness is lightness before correction, and output lightness is lightness after correction. The lightness after correction is decided in accordance with a characteristic based on minimum lightness after correction, the lightness of the maximum chroma color after gamut mapping, and maximum lightness after correction. The maximum lightness after correction is lightness obtained by adding the correction amount Mh to the lightness of the maximum chroma color after gamut mapping. The minimum lightness after correction is lightness obtained by subtracting the correction amount Ml from the lightness of the maximum chroma color after gamut mapping. In the lightness correction table, the relationship between the minimum lightness after correction and the lightness of the maximum chroma color after gamut mapping is defined as a characteristic that linearly changes. Furthermore, the relationship between the lightness of the maximum chroma color after gamut mapping and the maximum lightness after correction is defined as a characteristic that linearly changes. In FIG. 14, the maximum lightness before correction is lightness L1305 of the color 1305 as the maximum lightness color. The minimum lightness before correction is lightness L1306 of the color 1306 as the minimum lightness color. The lightness of the maximum chroma color after gamut mapping is lightness L1307 of the color 1307. The maximum lightness after correction is lightness L1310 obtained by adding the color difference ΔE 1308 as the correction amount Mh to the lightness L1307. In other words, the color difference between the maximum lightness color and the maximum chroma color is converted into a lightness difference. The minimum lightness after correction is lightness L1311 obtained by subtracting the color difference 1309 as the correction amount Ml from the lightness L1307. In other words, the color difference between the minimum lightness color and the maximum chroma color is converted into a lightness difference.

Figure 15:
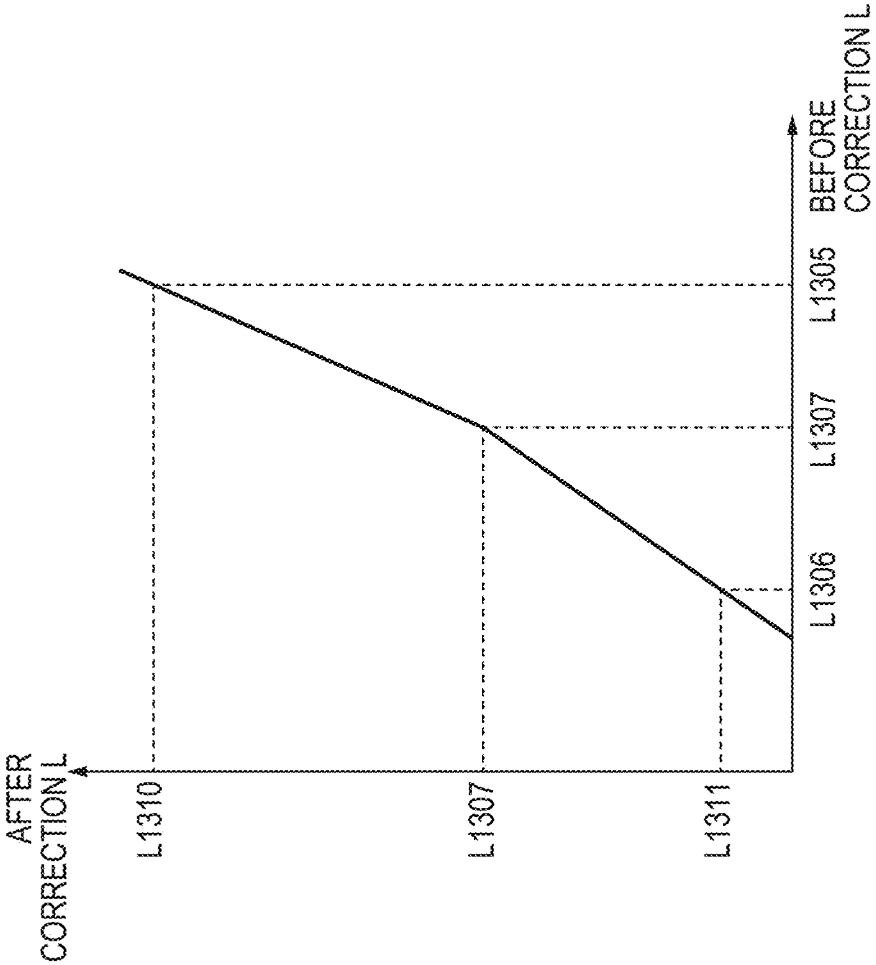
FIG. 15 is a graph showing a lightness correction table.

FIG. 15 is a graph showing an example of the lightness correction table for expanding lightness in the lightness direction in FIG. 14. In this embodiment, color degeneration correction is performed by converting the color difference ΔE into the lightness difference. Sensitivity to the lightness difference is high because of the visual characteristic. Therefore, by converting the chroma difference into a lightness difference, it is possible to make the user feel the color difference ΔE despite a small lightness difference because of the visual characteristic. In addition, the lightness difference is less than the chroma difference because of the relationship between the sRGB color gamut and the color gamut of the printing apparatus 108. Therefore, it is possible to effectively use the narrow color gamut by conversion into a lightness difference. In this embodiment, the lightness of the maximum chroma color is not changed. In this embodiment, since the lightness of the color with the maximum chroma is not changed, it is possible to correct the color difference ΔE while maintaining the lightness of the maximum chroma color. Correction of a value greater than the maximum lightness and a value less than the minimum lightness may be undefined since these values are not included in the input image data. Furthermore, the lightness correction table may be complemented. In this case, as shown in FIG. 15, a value may be complemented to obtain a linear change. As described above, it is possible to decrease the number of grids of the lightness correction table to reduce the capacity, and to reduce the processing time taken to transfer the lightness correction table.

If the maximum lightness after correction exceeds the maximum lightness of the color gamut after gamut mapping, the CPU 102 performs maximum value clip processing. The maximum value clip processing is processing of subtracting the difference between the maximum lightness after correction and the maximum lightness of the color gamut after gamut mapping in the whole lightness correction table. In other words, the whole lightness correction table is shifted in the low lightness direction until the maximum lightness of the color gamut after gamut mapping becomes equal to the maximum lightness after correction. In this case, the lightness of the maximum chroma color after gamut mapping is also moved to the low lightness side. As described above, if the unique colors of the input image data are localized to the high lightness side, it is possible to improve the color difference ΔE and to reduce color degeneration by using the lightness tone range on the low lightness side. On the other hand, if the minimum lightness after correction is lower than the minimum lightness of the color gamut after gamut mapping, the CPU 102 performs minimum value clip processing. The minimum value clip processing adds the difference between the minimum lightness after correction and the minimum lightness of the color gamut after gamut mapping in the whole lightness correction table. In other words, the whole lightness correction table is shifted in the high lightness direction until the minimum lightness of the color gamut after gamut mapping becomes equal to the minimum lightness after correction. As described above, if the unique colors of the input image data are localized to the low lightness side, it is possible to improve the color difference ΔE and reduce color degeneration by using the lightness tone range on the high lightness side.

Next, the CPU 102 applies, to the gamut mapping table, the lightness correction table created for each hue range. First, based on color information held by the output value of the gamut mapping, the CPU 102 decides the lightness correction table of a specific hue angle to be applied. For example, if the hue angle of the output value of the gamut mapping is 25°, the CPU 102 decides to apply the lightness correction table of the hue range 1201 shown in FIG. 13. Then, the CPU 102 applies the decided lightness correction table to the output value of the gamut mapping table to perform correction. The CPU 102 sets the color information after correction as a new output value after the gamut mapping. For example, referring to FIG. 14, the CPU 102 applies the decided lightness correction table to the color 1305 as the output value of the gamut mapping table, thereby correcting the lightness of the color 1305. Then, the CPU 102 sets the lightness of a color 1312 after correction as a new output value after the gamut mapping.

As described above, in this embodiment, the lightness correction table created based on the reference color is also applied to a color other than the reference color within the hue range 1201. Then, with reference to the color after the lightness correction, for example, the color 1312, mapping to a color gamut 1316 is performed not to change the hue, as will be described later. That is, within the hue range 1201, the color degeneration correction direction is limited to the lightness direction. With this arrangement, it is possible to suppress a change of a tint. Furthermore, it is unnecessary to perform color degeneration correction processing for all the combinations of the unique colors of the input image data, thereby making it possible to reduce the processing time.

In addition, in accordance with the hue angle of the output value of the gamut mapping, the lightness correction tables of adjacent hue ranges may be combined. For example, if the hue angle of the output value of the gamut mapping is Hn°, the lightness correction table of the hue range 1201 and that of a hue range 1202 are combined. More specifically, the lightness value of the output value after the gamut mapping is corrected by the lightness correction table of the hue range 1201 to obtain a lightness value Lc1201. Furthermore, the lightness value of the output value after the gamut mapping is corrected by the lightness correction table of the hue range 1202 to obtain a lightness value Lc1202. At this time, the intermediate hue angle of the hue range 1201 is a hue angle H1201, and the intermediate hue angle of the hue range 1202 is a hue angle H1202. In this case, the corrected lightness value Lc1201 and the corrected lightness value Lc1202 are complemented, thereby calculating a corrected lightness value Lc. The corrected lightness value Lc is calculated by:

$$Lc = \left|\frac{Hn - H_{1201}}{H_{1202} - H_{1201}}\right| \times Lc_{1201} + \left|\frac{Hn - H_{1202}}{H_{1202} - H_{1201}}\right| \times Lc_{1202} \tag{10}$$

As described above, by combining the lightness correction tables to be applied, in accordance with the hue angle, it is possible to suppress a sudden change of correction intensity caused by a change of the hue angle.

If the color space of the color information after correction is different from the color space of the output value after gamut mapping, the color space is converted and set as the output value after gamut mapping. For example, if the color space of the color information after correction is the CIE-L*a*b* color space, the following search is performed to obtain an output value after gamut mapping.

If the value after lightness correction exceeds the color gamut after gamut mapping, mapping to the color gamut after gamut mapping is performed. For example, the color 1312 shown in FIG. 14 exceeds the color gamut 1316 after gamut mapping. In this case, the color 1312 is mapped to a color 1314. A mapping method used here is color difference minimum mapping that focuses on lightness and hue. In color difference minimum mapping that focuses on lightness and hue, the color difference ΔE is calculated by the following equation. In the CIE-L*a*b* color space, color information of a color exceeding the color gamut after gamut mapping is represented by Ls, as, and bs. Color information of a color within the color gamut after gamut mapping is represented by Lt, at, and bt. Here, ΔL represents a lightness difference, ΔC represents a chroma difference, and ΔH represents a hue difference. In addition, WI represents a weight of lightness, Wc represents a weight of chroma, Wh represents a weight of a hue angle, and ΔEw represents a weighted color difference.

$$\Delta E = \sqrt{(L_s - L_t)^2 + (a_s - a_t)^2 + (b_s - b_t)^2} \tag{11}$$

$$\Delta L = \sqrt{(L_s - L_t)^2} \tag{12}$$

$$\Delta C = \sqrt{(a_s - a_t)^2 + (b_s - b_t)^2} \tag{13}$$

$$\Delta H = \Delta E - (\Delta L + \Delta C) \tag{14}$$

$$\Delta Ew = W1 \times \Delta L + Wc \times \Delta C + Wh \times \Delta H \tag{15}$$

Since the color difference ΔE is converted and expanded in the lightness direction, mapping is performed by focusing on lightness more than chroma. That is, the weight WI of lightness is larger than the weight Wc of chroma. Furthermore, since hue largely influences a tint, it is possible to minimize a change of the tint before and after correction by performing mapping by focusing on hue more than lightness and chroma. That is, the weight Wh of hue is equal to or greater than the weight Wl of lightness, and is greater than the weight Wc of chroma. As described above, according to this embodiment, it is possible to correct the color difference ΔE while maintaining a tint.

Furthermore, the color space may be converted at the time of performing color difference minimum mapping. It is known that in the CIE-L*a*b* color space, a color change in the chroma direction does not obtain the same hue. Therefore, if a change of the hue angle is suppressed by increasing the weight of hue, mapping to a color of the same hue is not performed. Thus, the color space may be converted into a color space in which the hue angle is bent so that the color change in the chroma direction obtains the same hue. As described above, by performing color difference minimum mapping by weighting, it is possible to suppress a change of a tint.

Referring to FIG. 14, the color 1305 obtained after performing gamut mapping for the color 1301 is corrected to the color 1312 by the lightness correction table. Since the color 1312 exceeds the color gamut 1316 after gamut mapping, the color 1312 is mapped to the color gamut 1316. That is, the color 1312 is mapped to the color 1314. As a result, in this embodiment, with respect to the gamut mapping table after correction, if the color 1301 is input, the color 1314 is output.

This embodiment has explained the example in which the lightness correction table is created for each hue range. However, the lightness correction table may be created by combining with the lightness correction table of the adjacent hue range. More specifically, within a hue range obtained by combining the hue ranges 1201 and 1202 in FIG. 13, the number of combinations of colors subjected to color degeneration is detected. Next, within a hue range obtained by combining the hue range 1202 and a hue range 1203, the number of combinations of colors subjected to color degeneration is detected. That is, by performing detection by overlapping each hue range, it is possible to suppress a sudden change of the number of combinations of colors subjected to color degeneration, at the time of crossing the hue ranges. In this case, a preferred hue range is a hue angle range obtained by combining two hue ranges, within which colors can be recognized as identical colors. For example, the hue angle in the CIE-L*a*b* color space is 30°. That is, one hue angle range is 15°. This can suppress a sudden change of correction intensity of color degeneration over hue ranges.

This embodiment has explained the example in which the color difference ΔE is corrected in the lightness direction by setting a plurality of unique colors as one group. As the visual characteristic, it is known that sensitivity to the lightness difference varies depending on chroma, and sensitivity to the lightness difference of low chroma is higher than sensitivity to the lightness difference of high chroma. Therefore, the correction amount in the lightness direction may be controlled by a chroma value. That is, the correction amount in the lightness direction is controlled to be small for low chroma, and correction is performed, for high chroma, by the above-described correction amount in the lightness direction. More specifically, if correction of lightness is performed by the lightness correction table, the lightness value Ln before correction and the lightness value Lc after correction are divided by a chroma correction ratio S. Based on a chroma value Sn of the output value after gamut mapping and a maximum chroma value Sm of the color gamut after gamut mapping at the hue angle of the output value after gamut mapping, the chroma correction ratio S is calculated by:

$$S = Sn/Sm \tag{16}$$

$$Lc' = S \times Lc + (1 - S) \times \mathrm{Ln} \tag{17}$$

That is, as the maximum chroma value Sm of the color gamut after gamut mapping is closer, the chroma correction ratio S is closer to 1, and Lc' is closer to the lightness value Lc after correction, which is obtained by the lightness correction table. On the other hand, as the chroma value Sn of the output value after gamut mapping is lower, the chroma correction ratio S is closer to 0, and Lc' is closer to the lightness value Ln before correction. In other words, as the chroma value Sn of the output value after gamut mapping is lower, the correction amount of lightness is smaller. Furthermore, the correction amount may be set to zero in a low-chroma color gamut. With this arrangement, it is possible to suppress a color change around a gray axis. Furthermore, since color degeneration correction can be performed in accordance with the visual sensitivity, it is possible to suppress excessive correction.

Third Embodiment

The third embodiment will be described below concerning points different from the first and second embodiments. This embodiment will describe an example in which a content is analyzed using information different from the pixel values of input image data.

In this embodiment, determination is performed based on a drawing instruction (to be described later) as information different from the pixel values of image data. The drawing instruction includes description information such as "photograph” or “character” that is assigned on application software when the user creates image data. By using the drawing instruction, it is possible to apply correction only to a content for which it is preferable to perform color degeneration correction.

With respect to area setting processing in step S104, processing using information different from pixel values will be described.

Figure 8:
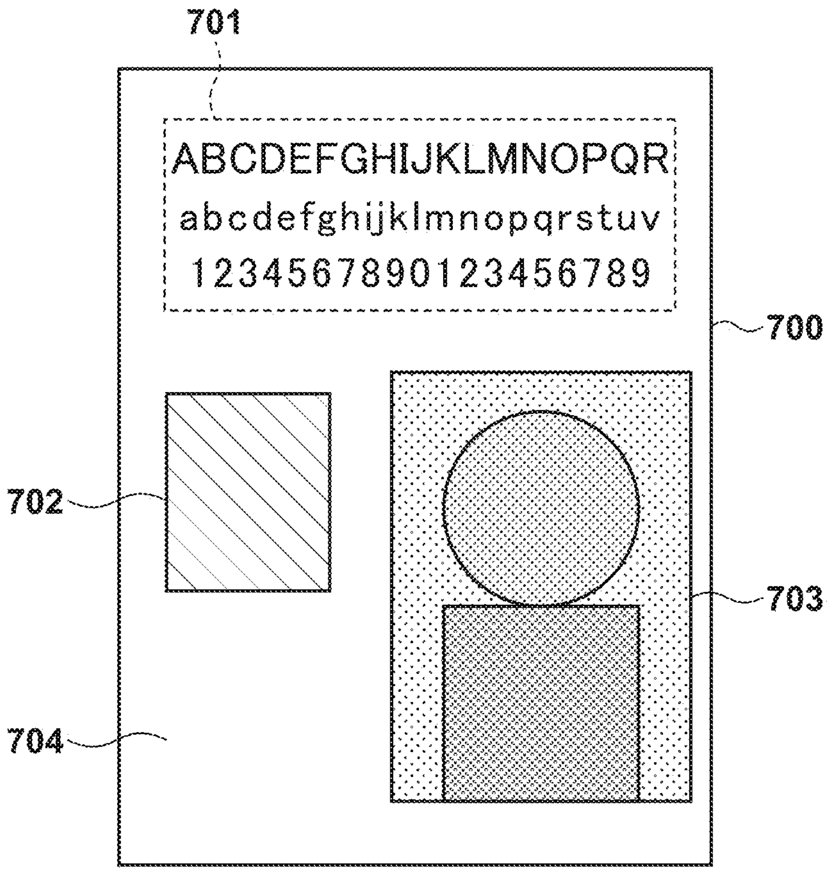
FIG. 8 is a view for explaining an original page.

FIG. 8 is a view for explaining an example of a page of image data (to be referred to as original data hereafter) input in step S101 of FIG. 2 according to this embodiment. Assume that document data is described in PDL. Here, PDL is an abbreviation for Page Description Language, and is formed by a set of drawing instructions on a page basis. The types of drawing instructions are defined for each PDL specification. In this embodiment, the following three types are used as an example.

Instruction (1) TEXT drawing instruction (X1, Y1, color, font information, character string information)

Instruction (2) BOX drawing instruction (X1, Y1, X2, Y2, color, paint shape) Instruction (3) IMAGE drawing instruction (X1, Y1, X2, Y2, image file information)

In some cases, drawing instructions such as a DOT drawing instruction for drawing a dot, a LINE drawing instruction for drawing a line, and a CIRCLE drawing instruction for drawing a circle are used as needed in accordance with the application purpose. For example, a general PDL such as Portable Document Format (PDF) proposed by Adobe, XPS proposed by Microsoft, or HP-GL/2 proposed by HP may be used.

An original page 700 in FIG. 8 represents one page of original data, and, as an example, the number of pixels is 600 horizontal pixels× 800 vertical pixels. An example of PDL corresponding to the document data of the original page 700 in FIG. 8 is shown below.

```
<PAGE=001>
<TEXT>50,50,550,100,BLACK,STD-
18,“ABCDEFGHIJKLMNOPQR”</TEXT>
<TEXT>50,100,550,150,BLACK,STD-18,“abcdefghijklmnopqrstuv”</TEXT>
<TEXT>50,150,550,200,BLACK,STD-18,“1234567890123456789”</TEXT>
<BOX>50,350,200,550,GRAY,STRIPE</BOX>
<IMAGE>250,300,580,700,“PORTRAIT.jpg”</IMAGE>
</PAGE>
```

<PAGE-001> of the first row is a tag representing the number of pages in this embodiment. Normally, since the PDL is designed to be able to describe a plurality of pages, a tag representing a page break is described in the PDL. In this example, the section up to </PAGE>represents the first page. In this embodiment, this corresponds to the original page 700 in FIG. 8. If the second page exists, <PAGE-002> is described next to the above PDL.

The section from <TEXT> of the second row to </TEXT> of the third row is drawing instruction 1, and this corresponds to the first row of an area 701 in FIG. 8. The first two coordinates represent the coordinates (X1, Y1) at the upper left corner of the drawing area, and the following two coordinates represent the coordinates (X2, Y2) at the lower right corner of the drawing area. The subsequent description shows that the color is BLACK (black: R=0, G=0, B=0), the character font is “STD” (standard), the character size is eighteen points, and the character string to be described is “ABCDEFGHIJKLMNOPQR”.

The section from <TEXT> of the fourth row to </TEXT> of the fifth row is drawing instruction 2, and this corresponds to the second row of the area 701 in FIG. 8. The first four coordinates and two character strings represent the drawing area, the character color, and the character font, like drawing instruction 1, and it is described that the character string to be described is “abcdefghijklmnopqrstuv”.

The section from <TEXT> of the sixth row to </TEXT> of the seventh row is drawing instruction 3, and this corresponds to the third row of the area 701 in FIG. 8. The first four coordinates and two character strings represent the drawing area, the character color, and the character font, like drawing instruction 1 and drawing instruction 2, and it is described that the character string to be described is “1234567890123456789”.

The section from <BOX> to </BOX> of the eighth row is drawing instruction 4, and this corresponds to an area 702 in FIG. 8. The first two coordinates represent the upper left coordinates (X1, Y1) at the drawing start point, and the following two coordinates represent the lower right coordinates (X2, Y2) at the drawing end point. Next, the color is GRAY (gray: R=128, G=128, B=128), and STRIPE (stripe pattern) is designated as the paint shape. In this embodiment, as for the direction of the stripe pattern, lines in the forward diagonal direction are used. The angle or period of lines may be designated in the BOX instruction.

Next, the IMAGE instruction of the ninth and tenth rows corresponds to an area 703 in FIG. 8. Here, it is described that the file name of the image existing in the area is “PORTRAIT.jpg”. This indicates that the file is a JPEG file that is a popular image compression format. Then, </PAGE> described in the 11th row indicates that the drawing of the page ends.

There is a case when an actual PDL file integrates “STD” font data and a “PORTRAIT.jpg” image file in addition to the above-described drawing instruction group. This is because if the font data and the image file are separately managed, the character portion and the image portion cannot be formed only by the drawing instructions, and information needed to form the image shown in FIG. 8 is insufficient. In addition, an area 704 in FIG. 8 is an area where no drawing instruction exists, and is blank.

In an original page described in PDL, like the original page 700 shown in FIG. 8, the area setting processing in step S104 of FIG. 2 can be implemented by analyzing the above PDL. More specifically, in the drawing instructions, the start points and the end points of the drawing y-coordinates are as follows, and these continue from the viewpoint of areas.

| Drawing instruction | Y start point | Y end point |
|---|---|---|
| First TEXT instruction | 50 | 100 |
| Second TEXT instruction | 100 | 150 |
| Third TEXT instruction | 150 | 200 |
| BOX instruction | 350 | 550 |
| IMAGE instruction | 300 | 700 |

In addition, it is found that both the BOX instruction and the IMAGE instruction are apart from the TEXT instructions by 100 pixels in the Y direction.

Next, in the BOX instruction and the IMAGE instruction, the start points and the end points of the drawing X-coordinates are as follows, and it is found that these are apart by 50 pixels in the X direction.

| Drawing instruction | X start point | X end point |
|---|---|---|
| BOX instruction | 50 | 200 |
| IMAGE instruction | 250 | 580 |

Thus, three areas can be set as follows.

| Areas | X start point | Y start point | X end point | Y end point |
|---|---|---|---|---|
| First area | 50 | 50 | 550 | 200 |
| Second area | 50 | 350 | 200 | 550 |
| Third area | 250 | 300 | 580 | 700 |

A CPU 102 determines a content in the first area as “character or graphic” in step S105. The CPU 102 determines a content in the second area as “character or graphic” in step S105. The CPU 102 determines a content in the third area as “photograph or gradation” in step S105.

As described above, according to this embodiment, a content is analyzed using a drawing instruction as information different from the pixel values of the input image data. By using drawing instructions, different areas can be set for overlapping contents that are difficult to perform determination with only the input image data. Characters of price information may be described to be partially superimposed on a product photograph in a POP image in a retail shop, or the like. In this case as well, it is possible to execute control to perform color degeneration correction for the characters of the price information and not to perform color degeneration correction for the product photograph. Furthermore, it is possible to set, as the same area, information in which characters are horizontally arranged by including spaces between them, like the character string in the area 701. Furthermore, even in a case when the background is solidly filled with a given color other than white, an area can be set.

Fourth Embodiment

The fourth embodiment will be described below concerning points different from the first to third embodiments. This embodiment will describe an arrangement of determining, based on information different from PDL description information and pixel information, whether to perform color degeneration correction.

The embodiment will explain an example of an application with which the user can assign, to a pixel of an input image, information indicating whether to perform color degeneration correction. The first embodiment has explained that a graphic should focus on visibility and readability. However, in a graphic, there exists information having the meaning of a color. For example, a color used for a corporate logo is called a corporate color, and represents a color for impressing a corporate image. Therefore, in a case when a corporate log is superimposed on a background graphic, a change of a color included in the logo may be undesirable for visibility and readability. In this embodiment, in a case when a graphic includes an area where color degeneration correction should not be performed, it is determined, based on information different from PDL description information and pixel information, whether to perform color degeneration correction.

In this embodiment, the application can accept, from the user, an operation of setting whether to perform color degeneration correction for a designated pixel. With this arrangement, the user's intention concerning execution of color degeneration correction can be reflected.

Figure 9A:
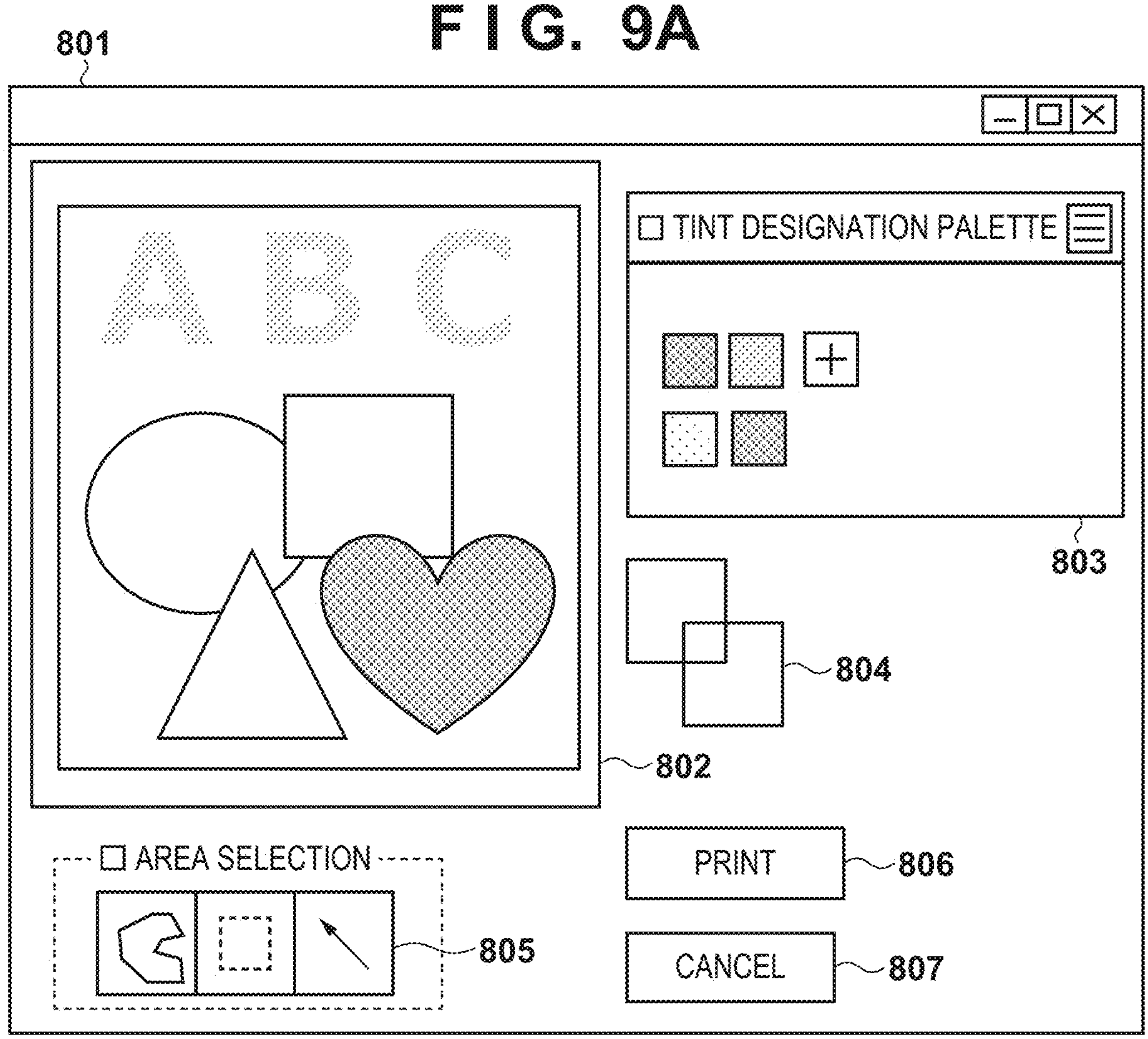
FIGS. 9A and 9B are views showing an UI screen of an image processing application.

FIG. 9A shows a UI screen of an image processing application operable by the user. A display screen 801 of the overall application includes an image display portion 802 of an image created by the application, a tint designation palette portion 803, and a filling palette 804. A corporate color is set by defining a color in the tint designation palette portion 803. Four colors are defined in the tint designation palette portion 803 but the user can add a color to be designated as a corporate color.

Figure 9B:
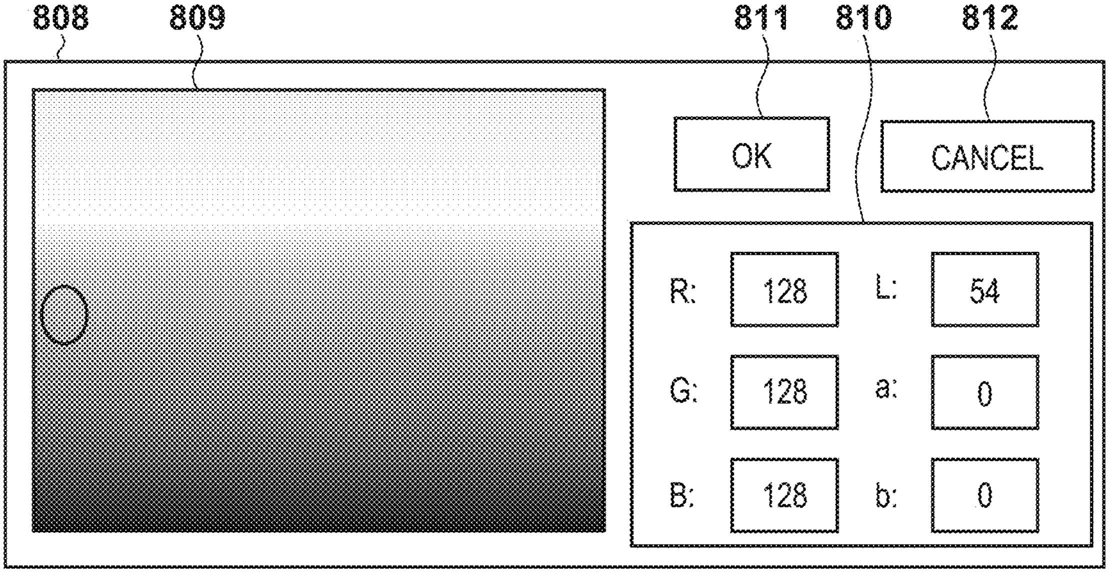

Upon the pressing of an area of “+”, a tint designation window 808 shown in FIG. 9B is displayed. The tint designation window 808 includes a gradation designation portion 809 where a color in gradation can be designated, and an absolute value designation portion 810 where a color can be designated by RGB values or Lab values. FIG. 9B shows, as an example, a state in which a tint is designated for a color of R=G=B=128. Upon the pressing of an OK button 811 for the decided tint, the color designated by the user is added to the tint designation palette portion 803. Upon the pressing of a cancel button 812, the tint designation palette is not updated. The color designated in the tint designation palette portion 803 is set as a color for which no color degeneration correction is performed at the time of image processing.

Upon the pressing of the filling palette 804, the tint designation window 808 shown in FIG. 9B is displayed. Upon the pressing of the OK button 811, a color designated by the user is added to the filling palette 804. The user can designate two colors on the UI by the filling palette 804.

The user can apply the color to the image display portion 802 by selecting the designated color by a pointer, and sliding and superimposing the color on the image display portion 802. The user can use a plurality of methods in an area selection portion 805 to apply the color to a specific portion of the image displayed in the image display portion 802. For example, the user can apply the color to the whole object area on which an arrow is slid and superimposed. By designating a designated area in the image display portion 802, as displayed by a solid-line frame or a dotted-line frame, the area can be filled with the color. FIG. 9A shows an example in which a character portion “A B C” and a heart of a graphic portion are filled with the color slid from the tint designation palette portion 803.

The application shown in FIGS. 9A and 9B is merely an example, and a UI operated by the user is not limited to this. For example, a UI designated by a Raster Image Processor (RIP) may be used. A UI for designating a tint for a specific area with respect to image data drawn in RGB colors may be used.

Figure 10:
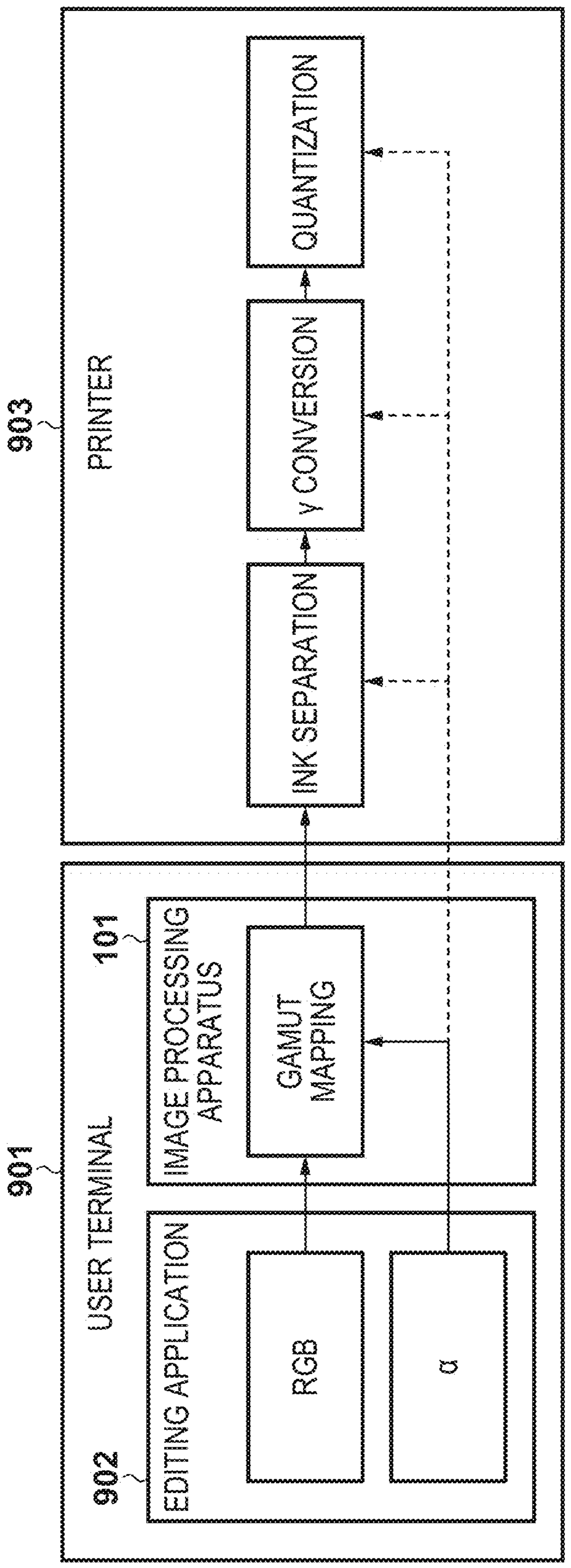
FIG. 10 is a block diagram showing an arrangement including an application.

FIG. 10 shows an example of an arrangement relationship among the application, an image processing apparatus 101, and a printing apparatus 108 according to this embodiment. A user terminal 901 includes the image processing apparatus 101 and an editing application 902 as an application according to this embodiment. Note that the image processing apparatus 101 may be included in the user terminal 901 or the user terminal 901 may serve as the image processing apparatus 101. That is, the user terminal 901 may serve as the image processing apparatus 101, and the editing application 902 may be installed on the image processing apparatus 101. In FIG. 10, the image processing apparatus 101 may be included in the printing apparatus 108.

The editing application 902 outputs the RGB information of image data as well as a plane information with respect to an area designated in the tint designation palette portion 803. The a plane information may be binary information of zero and one or multivalued information. In other words, the a plane information is information of an area for which the user designates not to perform color degeneration correction. The RGB information and the a plane information are input to the image processing apparatus 101, and gamut mapping is performed based on these pieces of information. The RGB information obtained as a result of performing the gamut mapping is input to the printing apparatus 108 and converted into quantization data for printing. The a plane information may be used for ink separation processing, y conversion processing, and quantization processing performed in the printing apparatus 108, as indicated by dotted lines.

Figure 11:
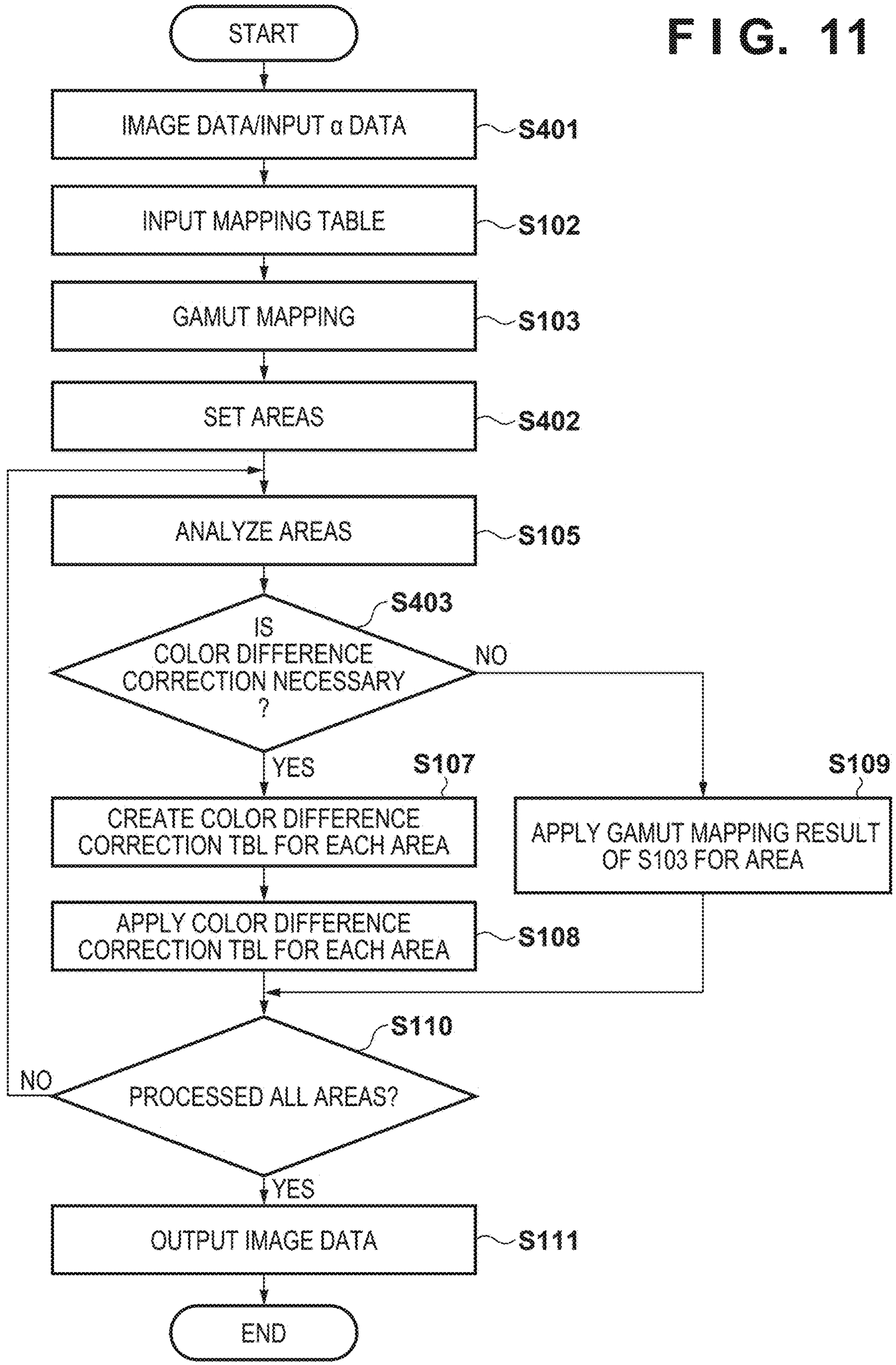
FIG. 11 is a flowchart illustrating image processing.

FIG. 11 is a flowchart illustrating gamut mapping processing according to this embodiment. The processing shown in FIG. 11 is implemented when, for example, a CPU 102 reads out a program stored in a storage medium 104 to a RAM 103 and executes the readout program. The processing shown in FIG. 2 may be executed by an image processing accelerator 105.

In step S401, the CPU 102 inputs input image data and corresponding a plane data. The a plane data includes, for each pixel, ON/OFF information for determining whether it is possible to perform color degeneration correction. In this embodiment, a=1 (ON) indicates that no color degeneration correction is performed, and a=0 (OFF) indicates that color degeneration correction is performed.

Steps S102 and S103 of FIG. 11 are the same as steps S102 and S103 of FIG. 2 and a description thereof will be omitted.

In step S402, area setting processing is performed, similar to the first embodiment. In addition, each area is set so that the a plane data is formed only by ON or OFF.

Step S105 of FIG. 11 is the same as step S105 of FIG. 2 and a description thereof will be omitted.

In step S403, the CPU 102 determines whether it is necessary to perform color degeneration correction for each area.

Figure 12:
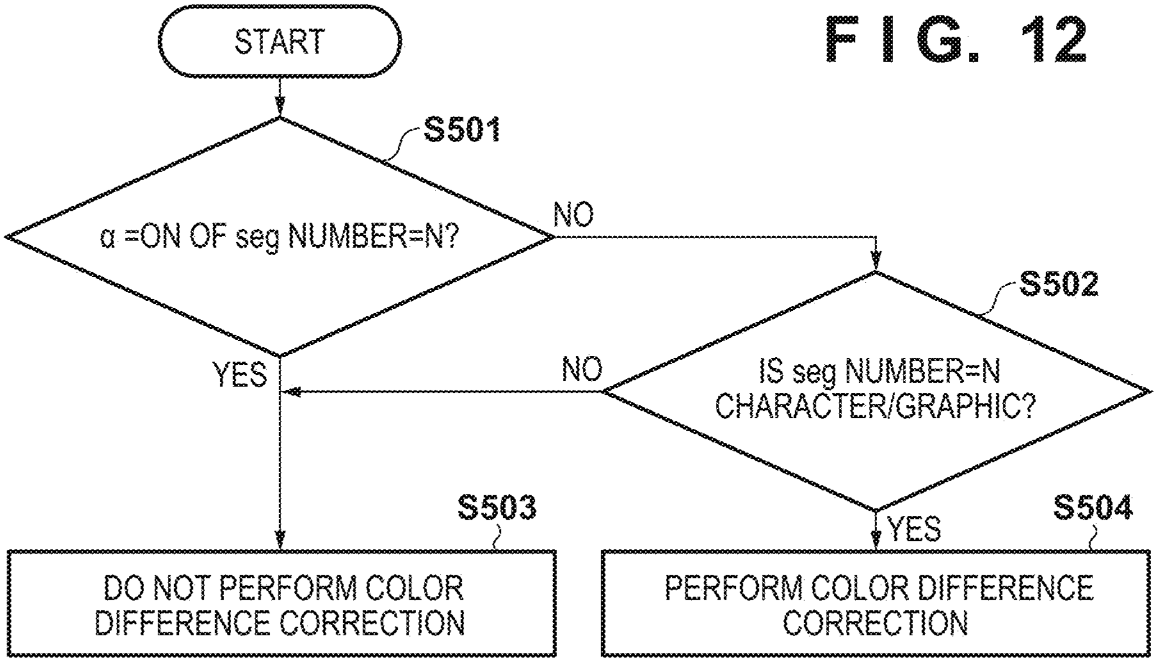
FIG. 12 is a flowchart illustrating processing of determining whether color degeneration correction for each area is necessary.

FIG. 12 is a flowchart illustrating the processing in step S403. In this embodiment, with the processing shown in FIG. 12, it is determined whether it is necessary to perform color degeneration correction for each area.

In step S501, the CPU 102 determines whether the a plane information assigned to a seg number=N is a=1 (ON). If the determination result indicates a=1 (ON), the process advances to step S503. Alternatively, if the determination result indicates a=0 (OFF), the process advances to step S502.

In step S502, the CPU 102 determines whether the area of the seg number=N is "character or graphic". If it is determined that the area is "character or graphic", the process advances to step S504. If it is determined that the area is not "character or graphic" (=the area is "photograph or gradation"), the process advances to step S503.

In step S503, the CPU 102 determines not to perform color degeneration correction for the area of the seg number=N, and stores the determination result in a memory area such as the RAM 103. In step S504, the CPU 102 determines to perform color degeneration correction for the area of the seg number=N, and stores the determination result in the memory area such as the RAM 103.

A case in which a=1 (ON) is determined indicates an area designated, by the user, as an area for which no color degeneration correction is performed. In this case, it is determined not to perform color degeneration correction without determining a content. On the other hand, in a case when a=0 (OFF) is determined, it is determined, based on the determination result of a content, whether it is necessary to perform color degeneration correction.

As described above, according to this embodiment, designation of whether to perform color degeneration correction for a pixel designated on the application is accepted from the user. According to this embodiment, it is possible to perform, for each area, appropriate gamut mapping according to the user's intention of creation of image data by using information designated by the user on the application.

According to this embodiment, a color designated on the application is not limited to a corporate color. For example, since an original color is given to each route in a rout map presented in a train ticket machine, or the like, the designated color may be the original color. Furthermore, since stamp information in which "confidential", "reproduction prohibited", or the like, is described is often set with red as a warning color, and this color desirably remains unchanged regardless of a document, the designated color may be the color used for the stamp information. The designated color may be a color used for legend information of a graph in which colors are desirably identical among pages. According to this embodiment, it is possible to execute control not to perform color degeneration correction with respect to a color that is not preferably changed in terms of visibility and readability.

Fifth Embodiment

The fifth embodiment will be described below concerning points different from the first to fourth embodiments. According to this embodiment, in a case when content information of each area is determined based on a likelihood, the correction intensity of color degeneration correction is controlled in accordance with the likelihood.

This embodiment assumes a case when the probability that the analysis result of a content is "photograph or gradation" and the probability that the analysis result of a content is "character or graphic" are not uniquely decided. In this case, if the higher probability is determined, a result of performing color degeneration correction may cause a result, not preferable for the content, that color continuity is lost. To cope with this, in this embodiment, the correction intensity of color degeneration correction is controlled in accordance with the likelihood of the content information of each area. With this arrangement, it is possible to reduce possibility that the result of performing color degeneration correction causes a result, not preferable for the content, that color continuity is lost.

As an example, assume that a likelihood that a given area set in step S104 of FIG. 2 is "character or graphic" is 80% and a likelihood that the given area is "photograph or gradation" is 20%. In this embodiment, for example, the likelihood is set based on the number of similar pixels of a histogram 404 or 405. In the first embodiment, the number of similar pixels of the histogram 404 or 405 is compared with the thresholds. In this embodiment, the ratio of the number of similar pixels to the total number of pixels of an area 400 or 401 is used as a likelihood. For example, in a case when the number of similar pixels is 20% of the total number of pixels of the area 400, the likelihood of "character or graphic" is 80% and the likelihood of "photograph or gradation" is 20%. In this embodiment, the correction intensity of color degeneration correction is controlled using the likelihood. As in the above-described example, if the probability that the area is "character or graphic" is 80%, a pixel value of gamut mapping is calculated using a result (a pixel value Kout) of performing color degeneration correction and a state (a pixel value Kin) before performing the color degeneration correction, given by:

$$K\_out = 0.8 \times K\_in + 0.2 \times K\_out \quad (18)$$

That is, in the above-described example, since the likelihood of "character or graphic" is 80%, the correction intensity of color degeneration correction is weakened from 100% to 80%. As a result, it is possible to reduce the possibility that the color degeneration correction is excessive.

If the likelihood of "character or graphic" is larger than 0%, it is determined, in the determination processing in step S106 of FIG. 2, that color degeneration correction is necessary. In this case, in step S305 of FIG. 6, a CPU 102 controls the correction intensity of color degeneration correction, as described above.

As described above, according to this embodiment, it is possible to control the correction intensity based on the likelihood of a content in which an area is analyzed. With this arrangement, it is possible to perform gamut mapping, on which the likelihood has been reflected, even for an area that is difficult to be determined as "character or graphic" or "photograph or gradation" as an analysis result.

The correction intensity of color degeneration correction indicates an amount of color continuity to be maintained. In this embodiment, it is possible to implement control to maintain color continuity to some extent or ensure a distance between colors to some extent with respect to a content for which it is determined that erroneous determination is readily made.

Sixth Embodiment

Figure 18A:
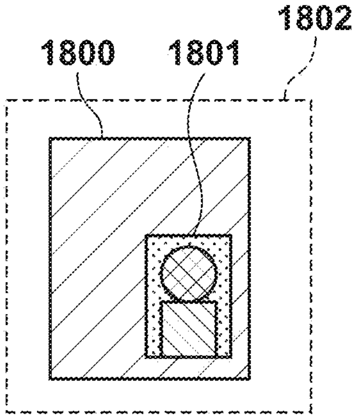
FIGS. 18A to 18C are views each for explaining the relationship between contents and an area.
Figure 18B:
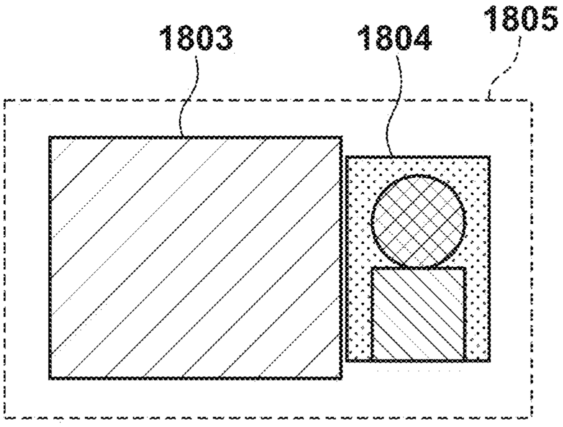

The sixth embodiment will be described below concerning points different from the first to fifth embodiments. This embodiment assumes that areas are set in step S104 so as to prevent a state in which one area includes one content. FIG. 18A shows an example in which there is no white pixel between a graphic content 1800 and a photographic content 1801 and the contents are superimposed on each other. In FIG. 18A, since the two contents are superimposed on each other, an area 1802 is obtained as a result of setting areas in step S104, and one area includes the two contents. FIG. 18B shows an example in which a graphic content 1803 and a photographic content 1804 are adjacent to each other. An area 1805 is obtained as an area setting result, and one area includes the two contents, similar to FIG. 18A.

First, assume that, with respect to the area, determination processing is performed using, as a threshold THnear, a value THratio decided as a determination criterion in step S105 based on the ratio between the number of area pixels and the number of similar pixels in the area. In the determination processing in step S105, a target pixel is inspected based on an edge detection area. If, as a result of comparing the target pixel with pixels around it, the pixel for which the ratio of similar pixels each of which has a difference in a pixel value falling within a predetermined range is high and the ratio of the same pixels/different pixels is low is decided as a similar pixel, the target pixel is determined as a "similar pixel". The number of pixels (=the number of similar pixels) that are determined as similar pixels in the area by scanning the area by an edge detection filter by setting the target pixel as the center is acquired.

Figure 19A:
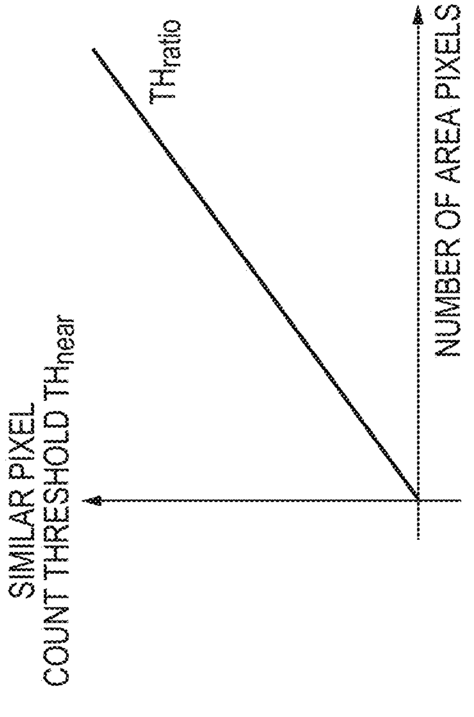
FIGS. 19A to 19D are graphs each showing the relationship between the number of area pixels and a similar pixel count threshold.

FIG. 19A is a graph showing the relationship among the number of area pixels, THratio, and the determination threshold THnear. For example, If "photograph or gradation" is determined in a case when the similar pixel ratio in the area is higher than 50%, THratio monotonically increases in accordance with the number of area pixels. For example, if the number of area pixels is one hundred, the threshold THratio is fifty. If the number of similar pixels is larger than fifty, "photograph or gradation" is determined.

As compared with, for example, an area including only a photographic content, the above-described area including the plurality of types of contents has a low similar pixel ratio. Therefore, such area may be determined as "character or graphic". For example, in FIG. 18B, assume that the graphic content 1803 has 200 as the number of area pixels and zero as the number of similar pixels and the photographic content 1804 has one hundred as the number of area pixels and eighty as the number of similar pixels. Assume also that, in a case when the similar pixel ratio in the area is higher than 50%, "photograph or gradation" is determined. At this time, if only the photographic content 1804 is set as an area, THratio is fifty and thus a determination result is "photograph or gradation". On the other hand, since the area 1805 has three hundred as the number of aera pixels, THratio is one hundred fifty. Since the area 1805 has eighty as the number of similar pixels, "character or graphic" is determined. In this example, it is possible to obtain "photograph or gradation" as a determination result by decreasing the ratio to further decrease THratio. However, depending on the size of an adjacent graphic content, a desired determination result is not obtained.

Figure 18C:
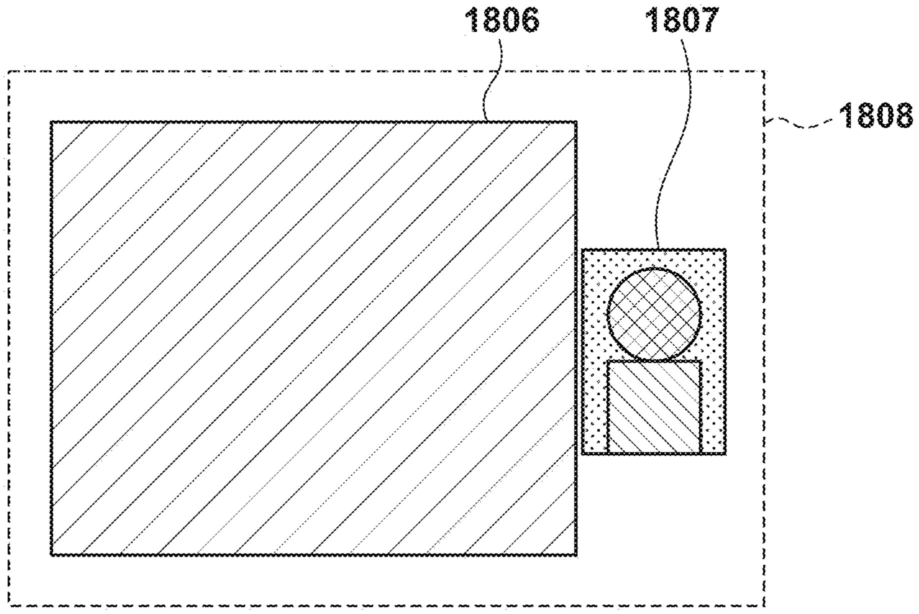

For example, consider a case when THratio is calculated by setting the similar pixel ratio in the area to 20%. In this case, since the determination threshold THratio of the area 1805 is sixty, "photograph or gradation" is determined. On the other hand, FIG. 18C shows an example in which the same photographic content as in FIG. 18B is adjacent to a graphic content 1806 having a greater number of pixels. In a case when the graphic content 1806 shown in FIG. 18C has 800 as the number of area pixels and zero as the number of similar pixels, the determination threshold THratio for an area 1808 is one hundred eighty. However, since the area 1808 has 80 as the number of similar pixels, "character or graphic" is determined. That is, although THratio is set to a lesser value to obtain "photograph or gradation" as a determination result, the determination result of the type of the content changes depending on the size of the adjacent graphic content. As a result, with respect to an area including a content to undergo color degeneration correction and a content not to undergo color degeneration correction in one area as a processing unit, color degeneration correction is performed based on a different type determination result.

For example, with reference to FIG. 18A, if color degeneration correction is performed for the photographic content 1801, the distance between colors is increased, but this may lose tint continuity that exists in the photographic content 1801. For example, since an ID photo, or the like, has a size with which person information can visually be perceived from printed information, it is considered to readily visually recognize a change of the color of the skin, or the like. In this way, a change of the characteristic of the tint continuity of the photographic content gives a result undesirable for the user. The same applies to a case when color correction is largely different depending on the type of the content in a state in which one area includes the plurality of contents, as shown in FIGS. 18A to 18C. For example, assume that color correction for enhancing chroma is performed for the graphic content and contrast enhancement processing is performed for the photographic content. At this time, if “character or graphic” is determined for a content that should be determined as “photograph or gradation”, chroma enhancement processing is performed for a photographic area and, for example, the reddish tint of the skin in a face photograph gives an impression different from that of the reddish tint remembered by the user.

To cope with this, in this embodiment, a value THabs decided regardless of the number of area pixels is used as the threshold THnear. The area including both the photographic content and the graphic content has a low similar pixel ratio, as compared with an area including only the photographic content, but has the same number of similar pixels. In this embodiment, by determining the type of the content based on the number of similar pixels regardless of the number of area pixels, for example, it is possible to reduce the influence of a decrease in similar pixel ratio caused by the graphic content in the area including both the photographic content and the graphic content.

In this embodiment, in step S105, the number of similar pixels existing in the area is acquired. The unique value THabs independent of the total number of pixels of the area is set as a threshold for determining “photograph or gradation”.

Figure 19B:
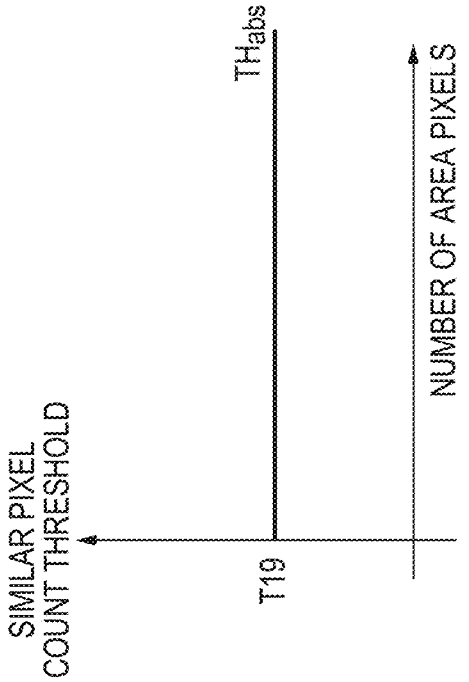
Figure 20:
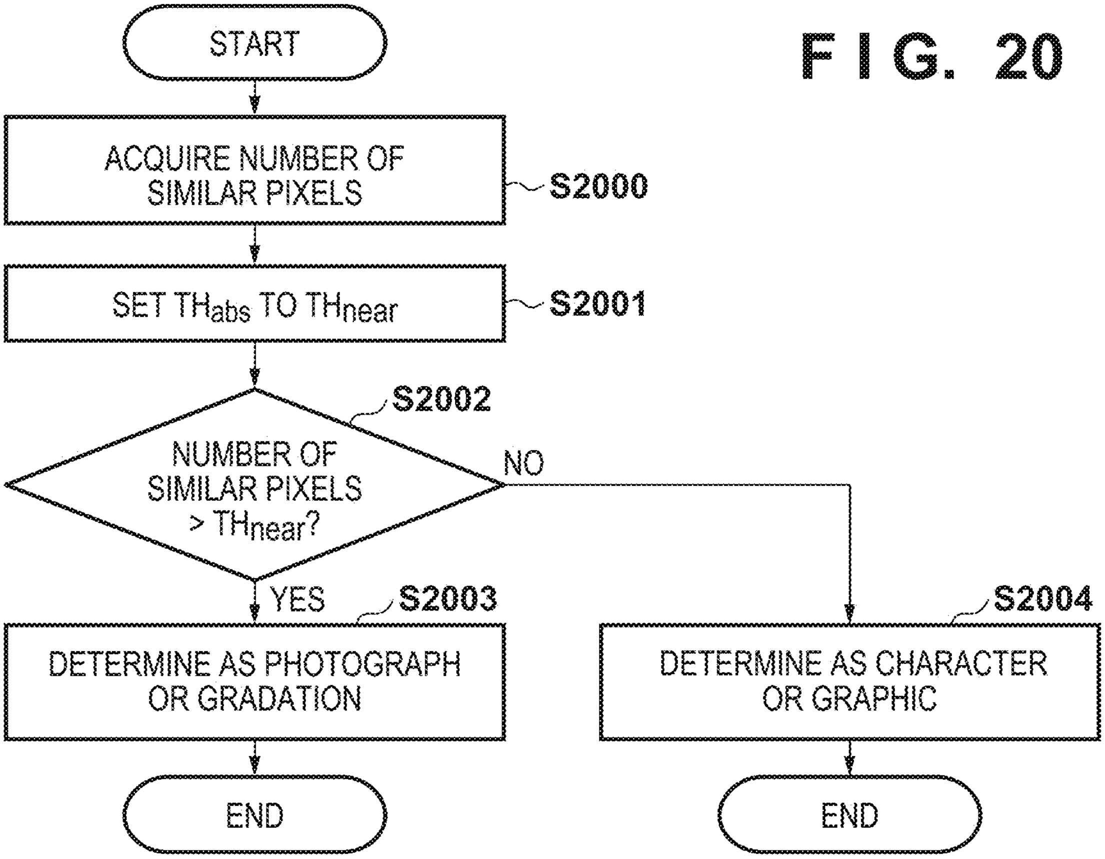
FIG. 20 is a flowchart illustrating processing of determining the type of a content.

FIG. 19B is a graph showing the relationship among the number of area pixels, THabs, and the determination threshold THnear. FIG. 20 is a flowchart illustrating processing of determining the type of a content according to this embodiment. The processing shown in FIG. 20 is implemented when, for example, a CPU 102 reads out a program stored in a storage medium 104 to a RAM 103 and executes the readout program. The processing shown in FIG. 20 is executed in step S105 of FIG. 2. In step S2000, the CPU 102 acquires the number of similar pixels in the area. Next, in step S2001, the CPU 102 sets THabs as the determination threshold THnear.

In step S2002, the CPU 102 compares the number of similar pixels acquired in step S2000 with THnear. If it is determined that a condition of “number of similar pixels >THnear” is satisfied, the CPU 102 determines in step S2003 that the type of the content is “photograph or gradation”. On the other hand, if it is determined that the above condition is not satisfied, the CPU 102 determines in step S2004 that the type of the content is “character or graphic”

Note that the value of THabs may be decided in accordance with the number of pixels of the content to be determined as “photograph or gradation”. FIG. 19B shows T19 as a unique value independent of the total number of pixels in the area. In this case, an area where the number of similar pixels is larger than T19 is determined as “photograph or gradation” regardless of the number of area pixels.

As described above, in this embodiment, a fixed threshold independent of the number of area pixels is set. Thus, with respect to the area including both the photographic content and the graphic content in one area as a processing unit, “photograph or gradation” can be determined in a case when a photographic content of a predetermined size or more exists. For example, with respect to the area including both the photographic content and the graphic content, no color degeneration correction is performed, thereby maintaining the characteristic of tint continuity. Not only in a case when color degeneration correction is performed, but also, in a case when different color correction is performed in accordance with the type of the content, as described above, it is possible to prevent the user from being given a sense of incongruity.

When determining the type of the content, the determination method is not limited to the above-described one, and another method may be used. For example, in a case when image data is PDL data such as PDF data and an attribute value for each area is added, the type of the content may be determined using the attribute value. For example, a graphic type may be determined for data added with a text attribute or a vector attribute, and a photographic type may be determined for data added with a bitmap attribute. By using the attribute value, it is unnecessary to scan the image data to perform the determination processing, thereby implementing processing at a higher speed.

Seventh Embodiment

The seventh embodiment will be described below concerning points different from the first to sixth embodiments. The sixth embodiment has explained that the value THabs independent of the number of area pixels is set as the threshold THnear. In this case, all the areas where the number of similar pixels is low are determined as “character or graphic”.

Figure 21A:
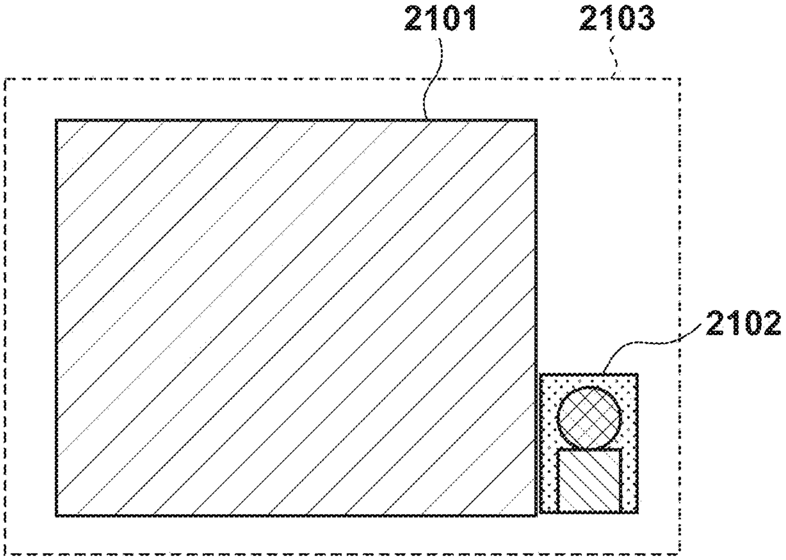
FIGS. 21A and 21B are views for explaining a difference according to the positional relationship between contents.
Figure 21B:
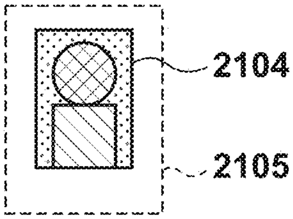

Assume here that even for contents of the same size, a portion of interest of the user may be different depending on the arrangement of the contents. FIG. 21A shows an example in which a graphic content 2101 and a photographic content 2102 are adjacent to each other. On the other hand, FIG. 21B shows an example in which only a photographic content 2104 that is completely the same as the photographic content 2102 is arranged. When the user sees the image shown in FIG. 21A, the graphic content attracts the attention of the user more than the photographic content. On the other hand, in a state in which only the photographic content is arranged, as the photographic content 2104 shown in FIG. 21B, the user may pay attention to contents of the photograph.

Assume here that a photographic content smaller than an ID photo size in A4 is determined as “character or graphic”. In a case when the photographic contents 2102 and 2104 are small, each has a small number of similar pixels, and are thus determined as “character or graphic”, the effect of ensuring the distance between colors by color degeneration correction for the graphic content 2101 is large in FIG. 21A. However, in FIG. 21B, since only the photographic content 2104 exists, the characteristic of tint continuity is changed by performing color degeneration correction, thereby giving the user a sense of incongruity.

In this embodiment, in addition to a value THabs independent of the number of area pixels, a value THratio dependent on the number of area pixels is used. As compared with the area including both the photographic content and the graphic content, the area including only the photographic content has a high similar pixel ratio. In this case, by using the similar pixel ratio as a determination threshold, it is possible to determine “photograph or gradation” for the area including only the photographic content and having the number of similar pixels smaller than the determination threshold.

In this embodiment, in step S105 of FIG. 2, the number of area pixels is acquired in addition to the number of similar pixels existing in the area. As thresholds for determining "photograph or gradation", both a value dependent on the total number of pixels (the number of area pixels) of the area and a value independent of it are set.

Figure 19C:
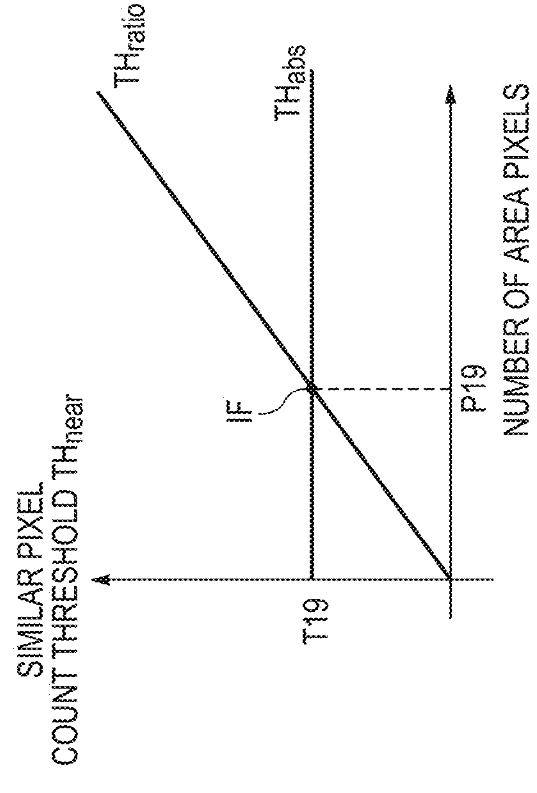
Figure 22:
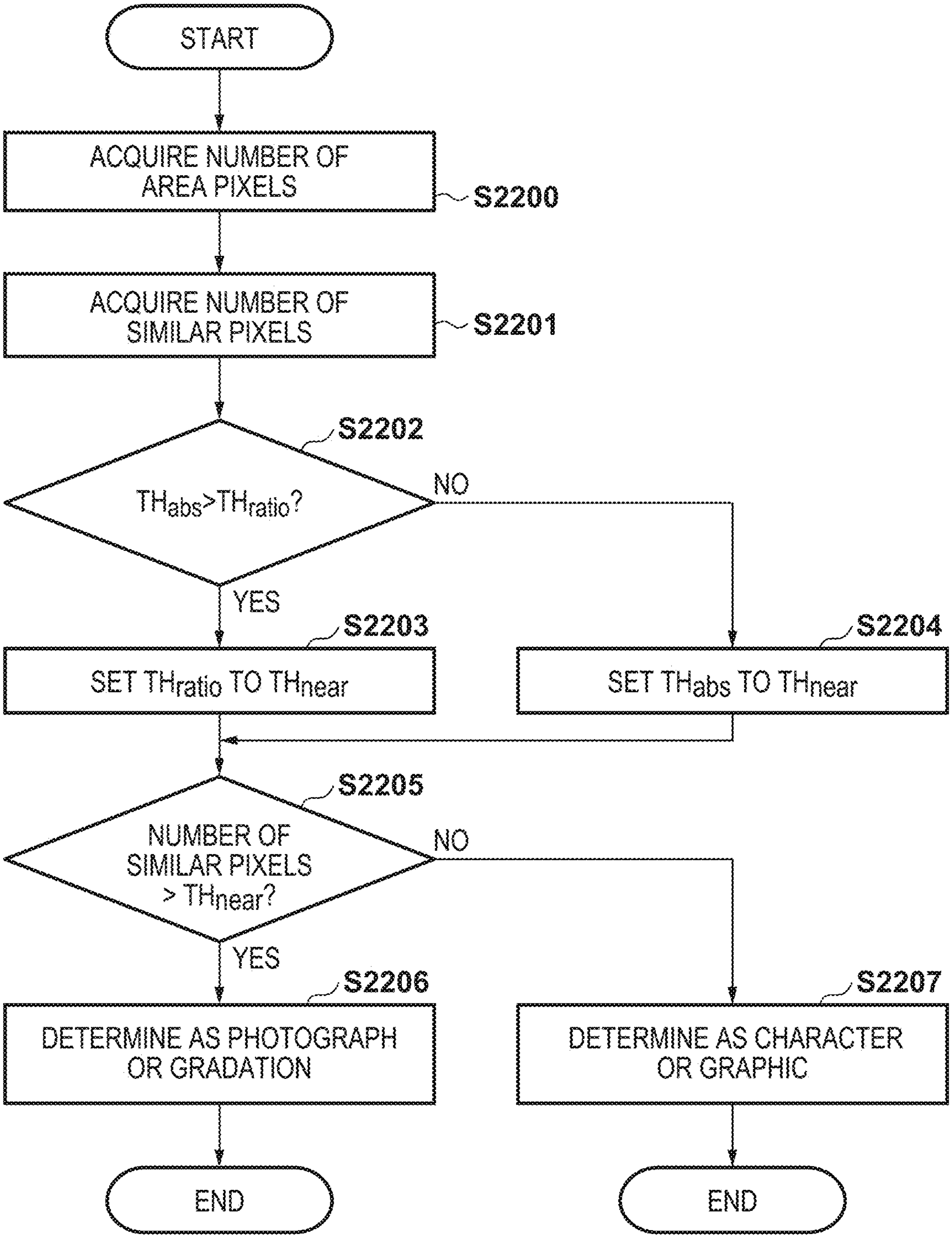
FIG. 22 is a flowchart illustrating processing of determining the type of a content.

FIG. 19C is a graph showing the relationship among the number of area pixels, THratio, THabs, and a determination threshold THnear. FIG. 22 is a flowchart illustrating the processing of determining the type of a content according to this embodiment. The processing shown in FIG. 22 is implemented when, for example, a CPU 102 reads out a program stored in a storage medium 104 to a RAM 103 and executes the readout program. The processing shown in FIG. 22 is executed in step S105 of FIG. 2.

In this embodiment, as an example, 50% of the number of area pixels is set as THratio, and 100 is set as THabs. In a case when the number of similar pixels in the area exceeds one of these values, "photograph or gradation" is determined. In this example, if the number of area pixels is 200, THratio is equal to THabs. If the number of area pixels is larger than 201, THabs is used as a determination criterion for determining "photograph or gradation". The number of area pixels with which THratio is equal to THabs is at an inflection point IF of the threshold. Referring to FIG. 19C, the inflection point IF is represented by (P19, T19) which is (200, 100).

In the following description, the photographic contents 2102 and 2104 have 50 as the number of similar pixels and 80 as the number of area pixels. The graphic content 2101 has zero as the number of similar pixels and five hundred as the number of area pixels. Furthermore, 50% of the number of area pixels is set as THratio and one hundred is set as THabs.

In step S2200, the CPU 102 acquires the number of area pixels. Since an area 2103 has 580 as the number of area pixels, THratio is 290. In step S2201, the CPU 102 acquires the number of similar pixels in the area. Then, in step S2202, the CPU 102 determines whether a condition of "THabs >THratio" is satisfied. If it is determined that the condition is satisfied, the CPU 102 sets THratio as THnear in step S2203. On the other hand, if it is determined that the condition is not satisfied, the CPU 102 sets THabs as THnear in step S2204.

In this example, since THabs is 100 and THratio is 290, it is determined that the condition is not satisfied, and THabs=100 is set as THnear in step S2204.

In step S2205, the CPU 102 compares the number of similar pixels acquired in step S2200 with THnear. If it is determined that a condition of "number of similar pixels >THnear", the CPU 102 determines in step S2206 that the type of the content is "photograph or gradation". On the other hand, if it is determined that the above condition is not satisfied, the CPU 102 determines in step S2207 that the type of the content is "character or graphic".

In this example, since the number of similar pixels is fifty and THnear is 100, it is determined that the condition is not satisfied, and "character or graphic" is determined in step S2207. On the other hand, for example, with respect to an area 2105, the number of area pixels is 80, the number of similar pixels is fifty, and THratio is forty. Therefore, since the condition of "THabs>THratio" is satisfied in step S2202, THratio=40 is set as THnear in step S2203. Since the condition of "number of similar pixels>THnear" is satisfied in step S2205, "photograph or gradation" is determined in step S2206.

As described above, in the case of a content with a small number of area pixels, the determination processing is performed based on the threshold using the similar pixel ratio, thereby making it possible to determine "photograph or gradation" for an area including only a single photographic content. With respect to the area including only a single photographic content, no color degeneration correction is performed, thereby maintaining the characteristic of tint continuity.

In this example, as a graphic content with a high similar pixel ratio and a small number of similar pixels, for example, a solid graphic content with a small number of area pixels and a blurred edge is assumed. Since this graphic content has a small number of area pixels, the effect of improving color discriminability by correcting the solid content and improving the appearance by chroma enhancement is large, as compared with an adverse effect of deterioration of tonality caused by correction for the blurred portion. In the above-described processing, such graphic content is determined as "photograph or gradation". Attention is paid here to the fact that the graphic content tends to include many portions where the same color continues. By using, for the number of same pixels, a threshold TH ratio_same obtained by setting a ratio with respect to the number of area pixels, it is possible to improve determination accuracy in this embodiment. The number of same pixels in this embodiment will be described below.

In this embodiment, in the determination processing in step S105, a target pixel is inspected based on an edge detection area. If, as a result of comparing the target pixel with pixels around it, the pixel for which the ratio of the same pixels is high and the ratio of similar pixels/different pixels is low is decided as the same pixel, the target pixel is determined as "same pixel". The number of pixels (=the number of same pixels) that are determined as the same pixels in the area by scanning the area by an edge detection filter by setting the target pixel as the center is acquired.

Figure 23:
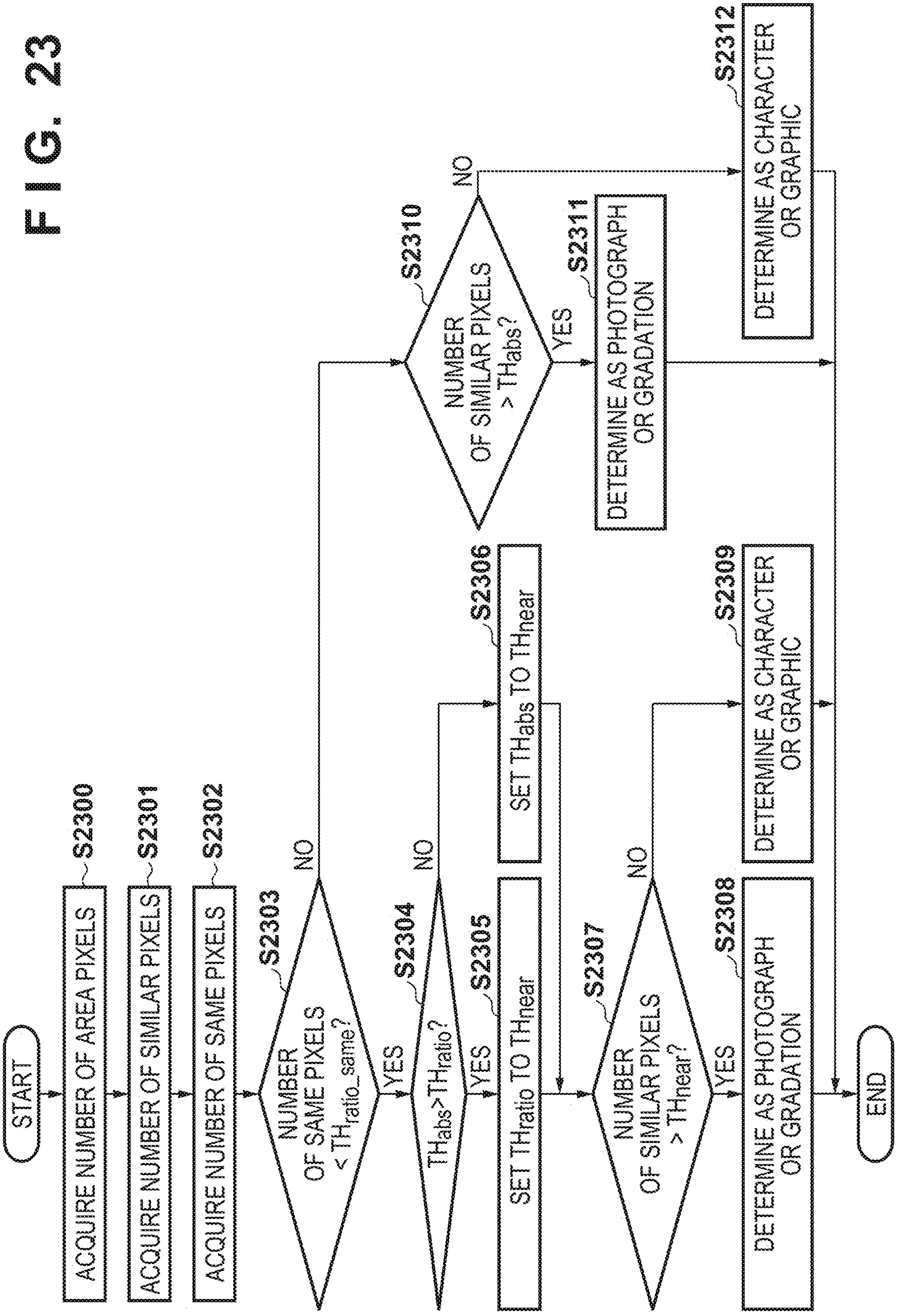
FIG. 23 is a flowchart illustrating processing of determining the type of a content.

FIG. 23 is a flowchart illustrating processing in a case when the same pixel ratio is used. The processing shown in FIG. 23 is implemented when, for example, the CPU 102 reads out a program stored in the storage medium 104 to the RAM 103 and executes the readout program. The processing shown in FIG. 23 may be executed in step S105 of FIG. 2. Steps S2300 and S2301 are the same as steps S2200 and S2201 of FIG. 22 and a description thereof will be omitted.

In step S2302, the CPU 102 acquires the number of same pixels in the area, as described above. In step S2303, the CPU 102 compares the number of same pixels acquired in step S2302 with THratio_same. If it is determined that the condition of "number of same pixels <THratio_same" is satisfied, the process advances to step S2304. Steps S2304 to S2309 are the same as steps S2202 to S2207 of FIG. 22 and a description thereof will be omitted.

On the other hand, if it is determined that the condition of "number of same pixels <THratio_same" is not satisfied, the process advances to step S2310. In step S2310, the CPU 102 compares the number of similar pixels acquired in step S2301 with THabs. If it is determined that a condition of "number of similar pixels >THabs" is satisfied, the CPU 102 determines in step S2311 that the type of the content is "photograph or gradation". On the other hand, if it is determined that the condition of "number of similar pixels >THabs" is not satisfied, the CPU 102 determines in step S2312 that the type of the content is "character or graphic". Thus, with respect to the above-described graphic content with a high similar pixel ratio and a small number of similar pixels, "character or graphic" can be determined. Note that the flowchart shown in FIG. 23 is merely an example, and the determination order and the method of the processing in each block are not limited to the above-described ones. For example, the determination processing may be performed using the threshold of the number of same pixels instead of the threshold of the same pixel ratio obtained by setting the ratio with respect to the number of area pixels, or may be performed using both the thresholds.

Eighth Embodiment

Points different from the first to seventh embodiments will be described below. In the seventh embodiment, in a case when the number of similar pixels is greater than one of THratio and THabs, "photograph or gradation" is determined. That is, in a case when the number of area pixels exceeds the inflection point IF decided by THratio and THabs, as shown in FIG. 19C, the determination threshold THnear is always THabs. That is, among areas where the number of area pixels exceeds the inflection point IF, all areas having the number of similar pixels equal to or greater than THabs are determined as "photograph or gradation".

It is not that a content as "photograph or graphic" includes no similar pixel. For example, examples are anti-aliasing and drop shadow. The user can visually perceive, at a distance from the printed product, an image with a sufficiently large area. For example, with respect to a poster in a shop or the like, chroma is enhanced, and it is necessary to attract people's attention and for the characters to be easily viewable. In this case, prioritizing the effect of the whole content over deterioration of image quality caused by color degeneration correction of an anti-alias part generated in details of the content is considered. In a case when such graphic content includes similar pixels the number of which is equal to or greater than a determination threshold THabs, if the number of area pixels exceeds the inflection point IF, "photograph or gradation" is uniformly determined. By increasing THabs, it is possible to determine the above-described graphic content as "character or graphic". However, a desired determination result is not obtained depending on the size of the graphic content.

For example, assume that there are a graphic content having 10 as the number of similar pixels and 100 as the number of area pixels and an enlarged graphic content having 100 as the number of similar pixels and 1,000 as the number of area pixels. As an example, 50% of the number of area pixels is set as THratio and 100 is set as THabs. At this time, the number of area pixels at the inflection point IF is 200 and is between 100 and 1,000. Therefore, THnear is THratio=50 for the former graphic content, and THnear is THabs=100 for the latter graphic content. As a result, while the former graphic content is determined as "character or graphic", the latter graphic content is determined as "photograph or gradation".

To determine "character or graphic" in a case when the size is sufficiently large with respect to the graphic content having a low similar pixel ratio and including similar pixels, a determination threshold dependent on the similar pixel ratio is considered to be provided even in a case when the number of area pixels is great. However, if the determination threshold based on the number of similar pixels is eliminated, an area including both a graphic content and a photographic content may be determined as "character or graphic", as described in the sixth embodiment.

To cope with this, in this embodiment, THabs is not made constant and is controlled using a weighting factor $\alpha$ dependent on the number of area pixels. In determining an area including both a graphic content and a photographic content, the area can be determined as "photograph or gradation". On the other hand, it is possible to determine, as "character or graphic", a graphic content having a low similar pixel ratio and including similar pixels. Furthermore, with respect to a photographic content of a predetermined size as a target of THabs, as the number of area pixels is greater, the ratio of the photographic content to the area is lower. Therefore, as the number of area pixels is larger, the effect obtained by applying color degeneration correction to the graphic content is greater.

Figure 19D:
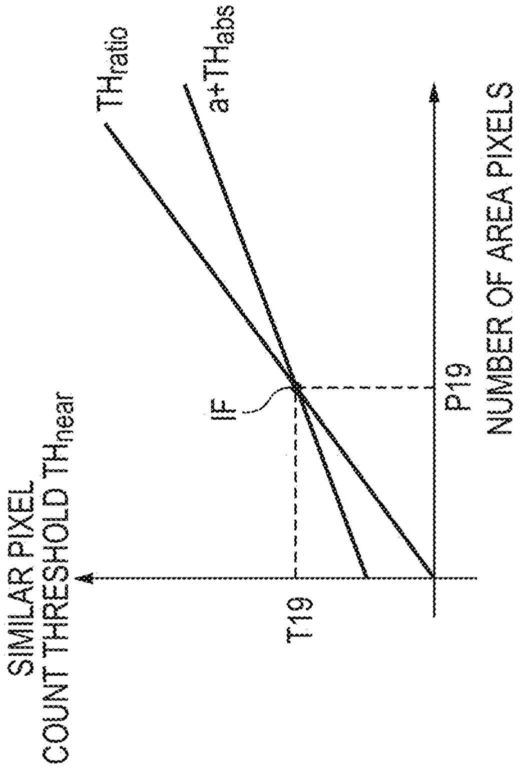
Figure 24:
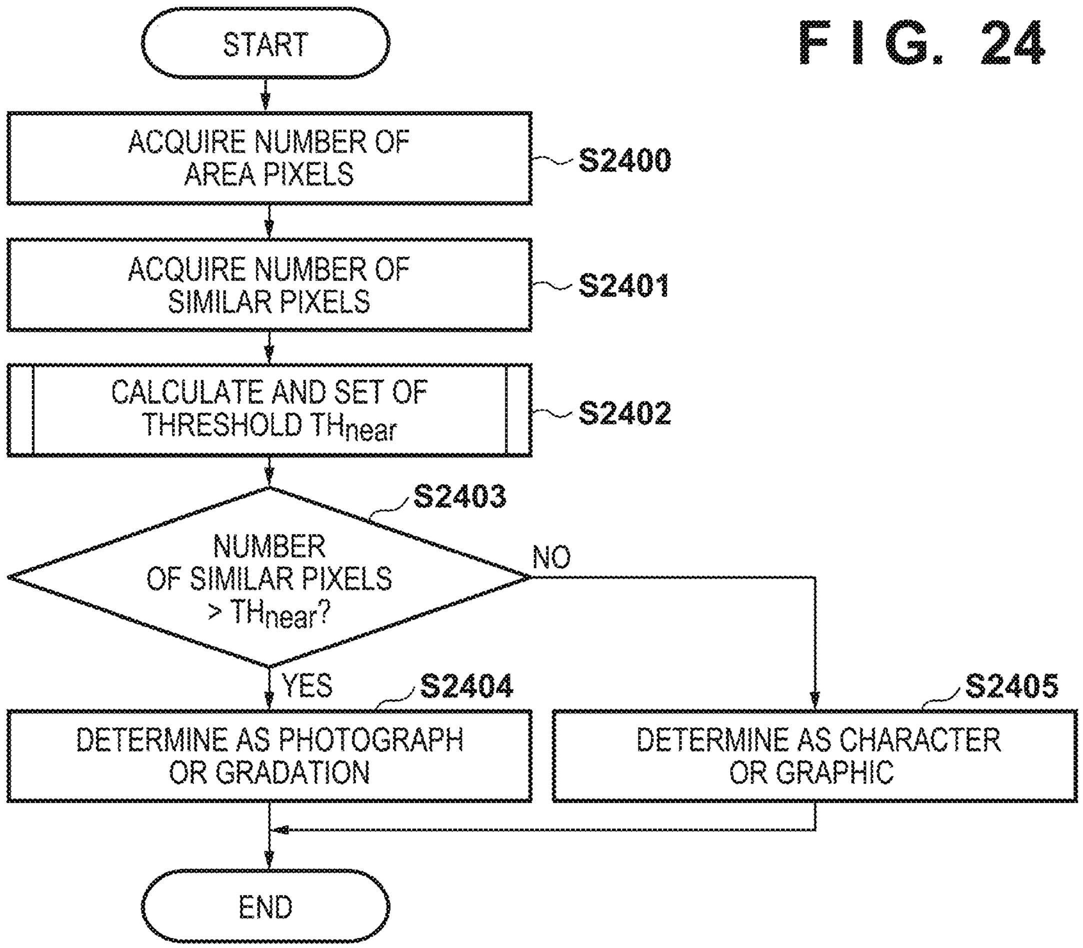
FIG. 24 is a flowchart illustrating processing of determining the type of a content.

FIG. 19D is a graph showing the relationship among the number of area pixels, THratio, $\alpha$+THabs, and the determination threshold THnear. FIG. 24 is a flowchart illustrating processing of determining the type of a content according to this embodiment.

The processing shown in FIG. 24 is implemented when, for example, a CPU 102 reads out a program stored in a storage medium 104 to a RAM 103 and executes the readout program. The processing shown in FIG. 24 is executed in step S105 of FIG. 2. Steps S2400, S2401, and S2403 to S2405 are the same as steps S2200, S2201, and S2205 to S2207 of FIG. 22 and a description thereof will be omitted.

As an example, 50% of the number of area pixels is set as THratio, 100 is set as THabs, and (number of area pixels-number of area pixels at inflection point IF)×0.1 is set as the weighting factor $\alpha$. At this time, when the number of area pixels is 200, $\alpha$+THabs is equal to THratio. That is, in FIG. 19D, P19 is 200 and T19 is 100. In a case when the number of area pixels is larger than 201, the threshold based on the number of similar pixels is used as a determination criterion.

Figure 25:
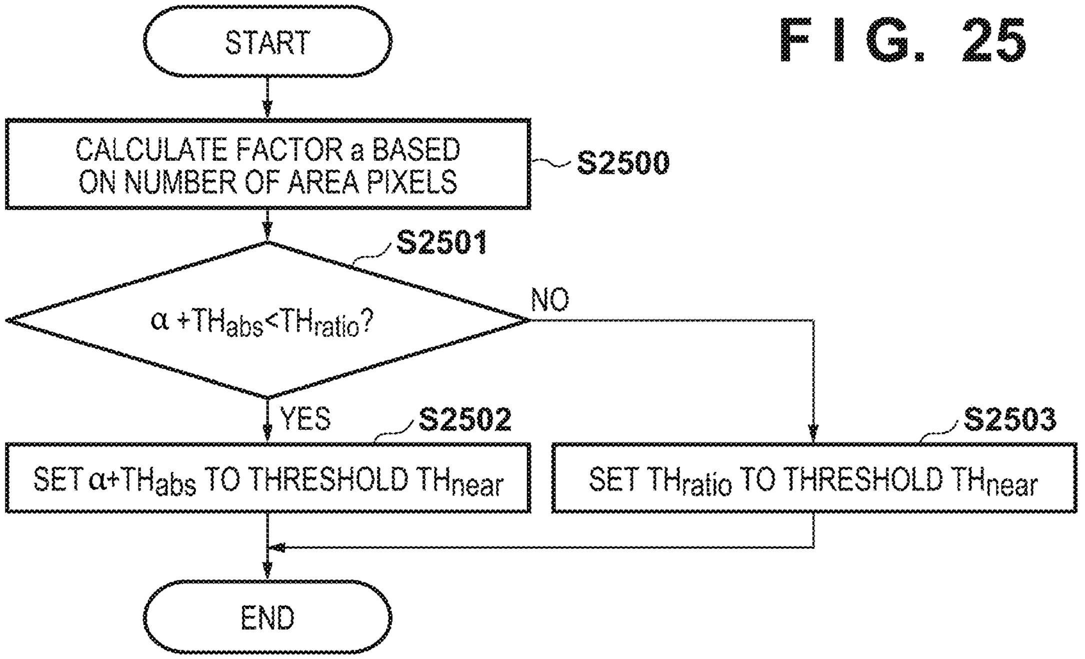
FIG. 25 is a flowchart illustrating the processing of determining the type of a content.

Processing in step S2402 will be described below with reference to FIG. 25. As an example, an area having 100 as the number of similar pixels and 1,000 as the number of area pixels is set as a processing target. In step S2500, the CPU 102 calculates the factor $\alpha$. In this example, $\alpha$=(1000-200)×0.1=80. In step S2501, the CPU 102 compares $\alpha$+THabs with THratio, and determines whether a condition of "$\alpha$+THabs<THratio" is satisfied. In this embodiment, $\alpha$+THabs=180 and THratio=500, it is determined that the condition is satisfied. If it is determined that the condition is satisfied, the CPU 102 sets $\alpha$+THabs as THnear in step S2502. On the other hand, if it is determined in step S2501 that the condition is not satisfied, the CPU 102 sets THratio as THnear in step S2503. After steps S2502 and S2503, the processing shown in FIG. 25 ends, and the process advances to step S2403 of FIG. 24. After that, based on THnear set in step S2402, the following determination processing is performed. In this example, since THnear is set to 180, it is determined in step S2403 that the condition of "number of similar pixels >THnear" is not satisfied, and "character or graphic" is determined in step S2405.

As described above, according to this embodiment, in a case when the number of area pixels is large, the number of area pixels is weighted in accordance with determination using THabs. This can cope with an increase in number of similar pixels caused by an increase in number of area pixels while maintaining the effect by THabs. For example, since the graphic content has the predetermined size or more, the content having a low similar pixel ratio and a large number of similar pixels can appropriately be determined as "character or graphic".

As described above, according to each of the embodiments, it is possible to appropriately perform color degeneration correction for each content in image data. With this arrangement, it is possible to reduce deterioration of image quality caused by uniformly performing color degeneration correction. Furthermore, the present invention is not limited to the arrangement described in each of the embodiments, and, as the arrangements such as the area setting method and the color conversion method, other arrangements may be used as long as the above-described effect is obtained. For example, in each of the embodiments, the image processing apparatus 101 causes the CPU 102 to perform the area setting processing and the color conversion processing. However, for example, the CPU 102 may be replaced by an ASIC, a GPU, an FPGA, or the like, to perform these processes.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:

one or more circuits; or one or more processors and at least one memory, the at least one memory being coupled to the one or more processors and having stored therein instructions executable by the one or more processors, wherein at least of the one or more circuits or the execution of the instructions cause the image processing apparatus to function as:

an input unit configured to input image data;

a generation unit configured to generate image data having undergone color gamut conversion from the image data input by the input unit using a conversion unit configured to convert a color gamut of the image data input by the input unit into a color gamut of a device configured to output the image data;

a correction unit configured to correct the conversion unit based on a result of the color gamut conversion; and a control unit configured to control execution of the correction by the correction unit for a content included in the image data input by the input unit, wherein the control unit controls execution of the correction by the correction unit for the content based on a type of the content, and the control unit performs control, in a case when the content is of a first type, to execute the correction by the correction unit for the content, and to performs control, in a case when the content is of a second type different from the first type, not to execute the correction by the correction unit for the content, in a case when the correction unit corrects the conversion unit, the generation unit generates image data having undergone color gamut conversion from the image data input by the input unit using the corrected conversion unit, and, in the image data having undergone the color gamut conversion by the corrected conversion unit, a color difference in the image data having undergone the color gamut conversion by the conversion unit before the correction is expanded.

2. The apparatus according to claim 1, wherein the image processing apparatus further functions as an acceptance unit configured to accept an instruction not to execute the correction by the correction unit, and even in a case when the content is of the first type, in a case when the acceptance unit accepts the instruction, the control unit performs control not to execute the correction by the correction unit for the content.

3. The apparatus according to claim 1, wherein the image processing apparatus further functions as a first determination unit configured to determine whether the content is of the first type or the second type, and the control unit controls execution of the correction by the correction unit for the content based on a result of the determination by the first determination unit.

4. The apparatus according to claim 3, wherein the image processing apparatus further functions as an analysis unit configured to analyze a pixel of the image data input by the input unit, and the first determination unit determines, based on a result of the analysis by the analysis unit, whether the content is of the first type or the second type.

5. The apparatus according to claim 3, wherein, based on a drawing instruction of the image data input by the input unit, the first determination unit determines whether the content is of the first type or the second type.

6. The apparatus according to claim 4, wherein the analysis unit analyzes a distribution of pixel values in the image data input by the input unit.

7. The apparatus according to claim 6, wherein the distribution of the pixel values is a distribution of the number of pixels having a first pixel value, the number of pixels having a second pixel value falling within a predetermined range to the first pixel value, and the number of pixels having a third pixel value falling outside the predetermined range to the first pixel value.

8. The apparatus according to claim 7, wherein, in a case when the number of pixels having the first pixel value is greater than a first threshold, the number of pixels having the second pixel value is less than a second threshold, and the number of pixels having the third pixel value is greater than a third threshold, the first determination unit determines that the content is of the first type.

9. The apparatus according to claim 7, wherein, in a case when the number of pixels having the second pixel value is greater than a fourth threshold, the first determination unit determines that the content is of the second type.

10. The apparatus according to claim 1, wherein the image processing apparatus further functions as a second determination unit configured to determine a likelihood that the content is of the first type or the second type, and the control unit controls execution of the correction by the correction unit for the content based on a result of the determination by the second determination unit.

11. The apparatus according to claim 10, wherein, based on the result of the determination by the second determination unit, the control unit controls a correction intensity by the correction unit for the content.

12. The apparatus according to claim 10, wherein the second determination unit analyzes a distribution of the number of pixels having a first pixel value, the number of pixels having a second pixel value falling within a predetermined range to the first pixel value, and the number of pixels having a third pixel value falling outside the predetermined range to the first pixel value in the image data input by the input unit, and determines, based on the number of pixels having the second pixel value, the likelihood that the content is of the first type or the second type.

13. The apparatus according to claim 12, wherein the control unit increases a correction intensity by the correction unit for the content as the likelihood of the first type is higher.

14. The apparatus according to claim 1, wherein, in a case when an area including the content is of the first type, the control unit performs control to execute correction by the correction unit for the area, and executes color correction corresponding to the content of the first type, and, in a case when the area including the content is of the second type, the control unit performs control not to execute correction by the correction unit for the area, and executes color correction corresponding to the content of the second type.

15. The apparatus according to claim 14, wherein the image processing apparatus further functions as a third determination unit configured to determine whether the area including the content is of the first type or the second type, and the control unit controls execution of the correction by the correction unit for the area based on a result of the determination by the third determination unit.

16. The apparatus according to claim 15, wherein the image processing apparatus further functions as an analysis unit configured to analyze a pixel of the image data input by the input unit, and the third determination unit determines, based on a result of the analysis by the analysis unit, whether the area including the content is of the first type or the second type.

17. The apparatus according to claim 16, wherein the analysis unit analyzes a distribution of pixel values in the image data input by the input unit.

18. The apparatus according to claim 17, wherein, in a case when a specific pixel in the area including the content is focused on, the analysis unit acquires the number of pixels each of which has a pixel value not equal to a pixel value of the specific pixel and has a difference in a pixel value falling within a predetermined range, and the third determination unit determines the area as the second type based on a result of the analysis by the analysis unit in a case when the number of pixels exceeds a preset threshold.

19. The apparatus according to claim 18, wherein the area including the content is an area including a content of the first type and a content of the second type.

20. The apparatus according to claim 18, wherein the threshold includes a first threshold that is constant regardless of the number of pixels of the area including the content.

21. The apparatus according to claim 18, wherein the threshold includes a second threshold that is greater as the number of pixels of the area including the content is greater.

22. The apparatus according to claim 18, wherein the threshold includes a first threshold that is constant regardless of the number of pixels of the area including the content and a second threshold that is greater as the number of pixels of the area including the content is greater.

23. The apparatus according to claim 19, wherein the third determination unit determines the area as the content of the second type even in a case when the area including the content includes the content of the first type.

24. The apparatus according to claim 19, wherein the content of the first type and the content of the second type are adjacent to each other in the area.

25. The apparatus according to claim 19, wherein the content of the first type and the content of the second type are superimposed on each other.

26. The apparatus according to claim 1, wherein a direction of the expansion of the color difference is a lightness direction.

27. The apparatus according to claim 26, wherein the color difference between colors included in a predetermined hue angle is expanded in the lightness direction.

28. The apparatus according to claim 1, wherein a direction of the expansion of the color difference is a chroma direction.

29. The apparatus according to claim 1, wherein a direction of the expansion of the color difference is a hue angle direction.

30. The apparatus according to claim 1, wherein the control unit performs control, in a case when an area including the content is of a first type, to execute correction by the correction unit for the area, and to perform control, in a case when the area including the content is of a second type different from the first type, not to execute correction by the correction unit for the area.

31. An image processing method comprising:

inputting image data;

generating image data having undergone color gamut conversion from the input image data using a conversion unit configured to convert a color gamut of the input image data into a color gamut of a device configured to output the image data;

correcting the conversion unit based on a result of the color gamut conversion; and controlling execution of the correction for a content included in the input image data, wherein controlling execution of the correction for the content is controlled based on a type of the content, and controlling execution of the correction, in a case when the content is of a first type, to execute the correction by the correction unit for the content, and to performs control, in a case when the content is of a second type different from the first type, not to execute the correction by the correction unit for the content, in a case when the conversion unit is corrected, image data having undergone color gamut conversion from the input image data is generated using the corrected conversion unit, and, in the image data having undergone the color gamut conversion by the corrected conversion unit, a color difference in the image data having undergone the color gamut conversion by the conversion unit before the correction is expanded.

32. A non-transitory computer-readable storage medium storing a program configured to cause a computer to function:

to input image data;

to generate image data having undergone color gamut conversion from the input image data using a conversion unit configured to convert a color gamut of the input image data into a color gamut of a device configured to output the image data;

to correct the conversion unit based on a result of the color gamut conversion; and to control execution of the correction for a content included in the input image data, wherein execution of the correction for the content is controlled based on a type of the content, and execution of the correction is controlled, in a case when the content is of a first type, to execute the correction by the correction unit for the content, and to performs control, in a case when the content is of a second type different from the first type, not to execute the correction by the correction unit for the content, in a case when the conversion unit is corrected, image data having undergone color gamut conversion from the input image data is generated using the corrected conversion unit, and, in the image data having undergone the color gamut conversion by the corrected conversion unit, a color difference in the image data having undergone the color gamut conversion by the conversion unit before the correction is expanded.

* * * * *